US009563839B2

(12) United States Patent
Nogaret

(10) Patent No.: US 9,563,839 B2
(45) Date of Patent: Feb. 7, 2017

(54) ARTIFICIAL NEURAL NETWORK SYSTEM

(71) Applicant: The University of Bath, Bath (GB)

(72) Inventor: Alain Nogaret, Bath (GB)

(73) Assignee: The University of Bath, Bath (GB)

( * ) Notice: Subject to any disclaimer, the term of this patent is extended or adjusted under 35 U.S.C. 154(b) by 0 days.

(21) Appl. No.: 14/403,486

(22) PCT Filed: May 7, 2013

(86) PCT No.: PCT/GB2013/051178
§ 371 (c)(1),
(2) Date: Nov. 24, 2014

(87) PCT Pub. No.: WO2013/175171
PCT Pub. Date: Nov. 28, 2013

(65) Prior Publication Data
US 2015/0178618 A1 Jun. 25, 2015

(30) Foreign Application Priority Data

May 25, 2012 (GB) .................................. 1209174.0

(51) Int. Cl.
*G06F 15/18* (2006.01)
*G06N 3/04* (2006.01)
*G06N 3/063* (2006.01)

(52) U.S. Cl.
CPC ............... *G06N 3/04* (2013.01); *G06N 3/049* (2013.01); *G06N 3/0635* (2013.01)

(58) Field of Classification Search
None
See application file for complete search history.

(56) References Cited

U.S. PATENT DOCUMENTS

2003/0120385 A1 6/2003 Etienne-Cummings et al.
2008/0243202 A1* 10/2008 Patangay ........... A61B 5/02028
607/27
2009/0091377 A1* 4/2009 Ginosar ............. G06K 9/00543
327/553

FOREIGN PATENT DOCUMENTS

WO WO-9309513 A1 5/1993

OTHER PUBLICATIONS

Tenore et al. "A Spiking Silicon Central Pattern Generator With Floating Gate Synapses", IEEE, 2005, pp. 4106-4109.*
Ameniya et al., An analog cmos central pattern generator for interlimb coordination in quadrupled locomotion, IEEE Transactions on Neural Networks, IEEE Service Center, Piscataway, NJ, US, vol. 14, No. 5, pp. 1356-1364 (2003).
M. Rabinovoch et al., Dynamical Encoding by Networks of Competing Neuron Groups: Winnerless Competition, Physical Review Letters, vol. 87, No. 6, pp. 068102-1 to 068102-4 (2001).
Young Jun Lee et al., Low power CMOS adaptive electronic central pattern generator design, Circuits and Systems, 48th Midwest Symposium, pp. 1350-1353 (2005).

(Continued)

*Primary Examiner* — Li-Wu Chang
(74) *Attorney, Agent, or Firm* — Winstead PC

(57) ABSTRACT

A non-biological asynchronous neural network system comprising multiple neurons to receive respective input signals representing an input stimulus for the network, supply an output signal representing a spatio-temporal sequence of rhythmic electric pulses to an external system, wherein respective ones of the multiple neurons are connected using multiple mutually inhibitory links.

23 Claims, 23 Drawing Sheets

(56) References Cited

OTHER PUBLICATIONS

Vogelstein R.J. et al., A Silicon Central Pattern Generator Controls Locomotion in Vivo, IEEE Transactions on Biomedical Circuits and Systems, vol. 2, No. 3, pp. 212-222 (2008).
A. Samardak et al., Noise-Controlled Signal Transmission in a Multithread Semiconductor Neuron, Physical Review Letters, vol. 102, No. 22 pp. 226802-1 to 2268002-4 (2009).
Alain Nogaret et al., Modulation of respiratory sinus arrhythmia in rats central pattern generator hardware, Journal of Neuroscience Methods, vol. 212, No. 1, pp. 124-132 (2013).
International Search Report mailed Jan. 21, 2014—Authorized Officer—Markus Volkmer.

* cited by examiner (a)
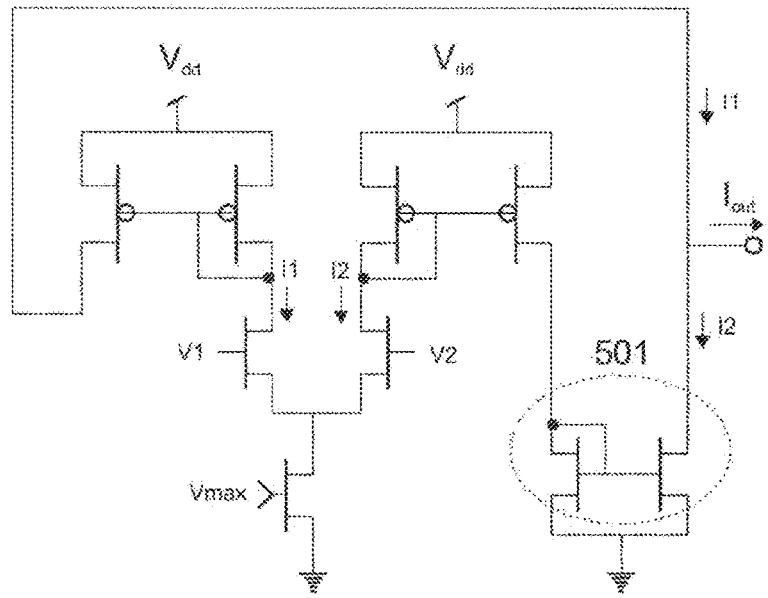
(b)
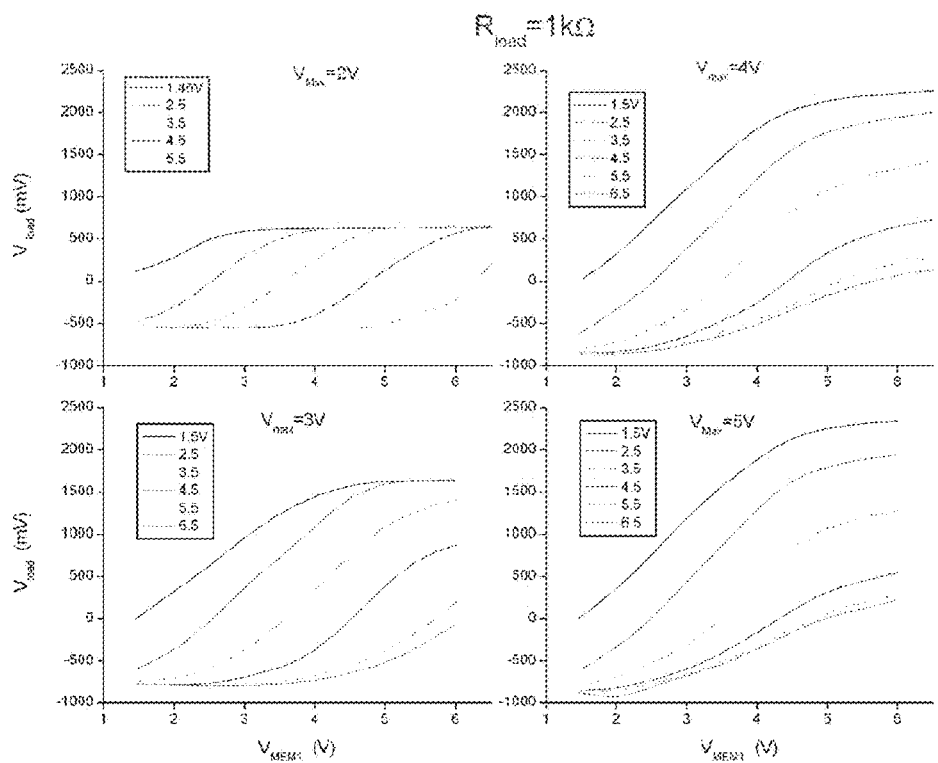
Figure 6

ARTIFICIAL NEURAL NETWORK SYSTEM

BACKGROUND

Neural networks are formed from multiple neurons which communicate with each other via synapses in order to deliver or process information via chemical and electrical signaling. For a chemical synapse, a complex sequence of events causes the neuron to fire. However, regardless of the various physical mechanisms of the communication at chemical synapses, the effect of synaptic input can be classed as either excitatory (raising membrane potential) or inhibitory (lowering membrane potential). Neurons also communicate via a second type of synapse called gap junctions or electrical synapses which fulfil a role similar to chemical synapses. Gap junctions, unlike chemical synapses, introduce no time delay in electrical signalling from the pre-synaptic neuron to the post-synaptic neuron.

Central pattern generators (CPG) are neural networks that are responsible for coordinating motor activity in animals and humans and endogenously generating the rhythms that sustain life. Central pattern generators typically serve multiple functions ranging from roles which are central to movement, breathing, swimming, swallowing, rhythm generation and other oscillatory functions, transient or permanent. Central pattern generators are found in all animals from invertebrates such as leeches or gastropods to the brain stem of mammals.

SUMMARY

According to an example, there is provided a neural network to generate spatio-temporal sequences of electric pulses in order to enable the coordination of distributed processes. In an example, electronic neurons are interconnected through mutually inhibitory links and compete to fire in turn. Electrical activity thus bounces from one neuron to the next following stable paths in the network whose trajectory depends on an applied stimulus. In an example, inhibitory links can be switched to excitatory links as desired.

According to an example, there is provided a non-biological asynchronous neural network system comprising multiple neurons to receive respective input signals representing an input stimulus for the network, supply an output signal representing a spatio-temporal sequence of rhythmic electric pulses to an external system, wherein respective ones of the multiple neurons are connected using multiple mutually inhibitory links. A proportion of respective ones of the neurons can be connected using mutually excitatory links selected on the basis of desired functions of a central pattern generator. For example, a proportion of excitatory synapses can vary between 0 and 100%. The number of excitatory synapses can vary in dependence on a type of biological central pattern generator (CPG) to be modelled, such as a CPG for the heart, or for breathing, or swimming and so on. In an example, a matrix of conductances is computed and used for a given rhythmic pattern. Typically, some of conductances will be positive (excitatory) the others negative (inhibitory). An inhibitory link can be a synaptic link between a pair of neurons to form a synapse and which is formed using a differential current amplifier. A neuron membrane can include multiple conductance components to mimic a response of biological neurons. The conductance of the neuron membrane channels can control the membrane voltage of a neuron. The differential current amplifier can receive as inputs respective output membrane voltage measures from a pair of neurons. The differential current amplifier can receive a control signal as input to control the conductance of the synapse.

According to an example, there is provided a non-biological asynchronous neural network system, wherein neurons are composed of multiple pairs of differential CMOS transistors. Selected input signals can be used generate specific limit cycles for the network.

According to an example, there is provided a central pattern generator comprising multiple neurons connected together in a predetermined configuration using multiple mutually inhibitory links, the neurons to receive input signals representing an input stimulus for the generator, supply an output signal representing a sequence of periodic electric pulses for use in an external system. The neurons can be formed from multiple differential pairs of CMOS transistors representing channel conductance components for the neurons. The channel conductance components can use the input signals to provide a membrane voltage value for a neuron. In an example, a differential current amplifier can receive as input respective membrane voltage values from a pair of neurons in order to provide an inhibitory synaptic link therebetween. The differential current amplifier can be a CMOS-based differential current amplifier including a control transistor to control a conductance value of the synaptic link. The control transistor can provide a conductance value representing a degree of coupling between neurons whose membrane voltages are input to the differential current amplifier. In an example, the central pattern generator can provide an excitatory or inhibitory action by redirecting an output current towards the pre- or the post-synaptic neuron.

According to an example, there is provided an integrated circuit comprising multiple differential pairs of CMOS transistors arranged to form a network system as claimed in any of claims 1 to 9.

According to an example, there is provided an integrated circuit comprising multiple differential pairs of CMOS transistors arranged to form a central pattern generator as claimed in any of claims 10 to 16.

According to an example, there is provided a method of generating a coordinated spatio-temporal sequence of electrical pulses using an artificial neural network, comprising interconnecting multiple CMOS-based neuron components using mutually inhibitory synaptic links by selecting a conductance value for artificial synaptic links which corresponds to an inhibitory synapse, providing an input stimulus for the network to cause multiple ones of the neurons to fire along a stable path in the network, generating an output sequence of electrical pulses. For a pair of neurons in the network, the conductance value can be selected such that a current injected into the post-synaptic neuron is proportional to the voltage difference between the membrane voltage of the pre-synaptic neuron and the membrane voltage of the post-synaptic neuron. An inhibitory synapse can include a differential current amplifier, the conductance value controlled using the gate voltage of a current source for the amplifier. In an example, the neural network can be asynchronous.

According to an example, there is provided a pacemaker for use with a heart to coordinate the contraction of the heart chambers by stimulating them with a coordinated sequence of electrical pulses, comprising a CPG as claimed in any of claims 10 to 16 or an integrated circuit as claimed in claim 18 to provide the coordinated sequence of pulses responsive to an input stimulus. Strokes of the heart chambers can be coordinated using the sequence of pulses. The CPG is operable to synchronise the coordinated sequence of pulses in response to changes in the input stimulus in order to modulate the strokes of the chambers. The CPG modulates the strokes of the chambers to synchronise with other body rhythms. The CPG is operable to adjust the input stimulus in response to changes in an external condition.

BRIEF DESCRIPTION OF THE DRAWINGS

An embodiment of the invention will now be described, by way of example only, and with reference to the accompanying drawings, in which:

FIG. 6(a) is a schematic representation of a circuit to implement a gap junction synapse according to an example;

FIG. 6(b) shows a series of plots of a gap junction synapse output voltage according to an example;

DETAILED DESCRIPTION

It will be understood that, although the terms first, second, etc. may be used herein to describe various elements, these elements should not be limited by these terms. These terms are only used to distinguish one element from another. The terminology used herein is for the purpose of describing particular examples only and is not intended to be limiting. As used herein, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
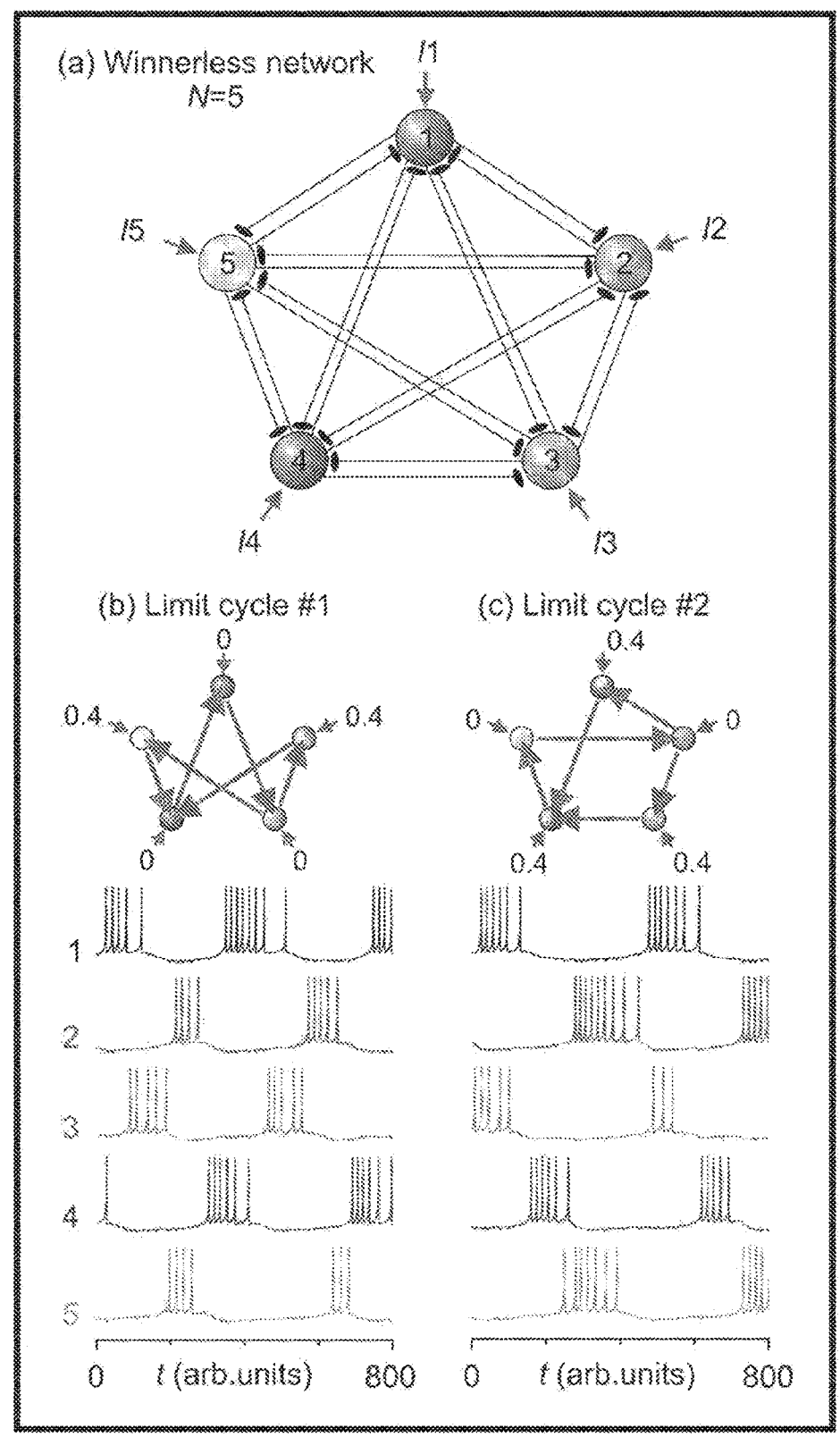
FIG. 1(a) represents a neural network of 5 neurons that compete through mutually inhibitory synapses according to an example.
FIGS. 1(b) and 1(c) depict two examples of coordinated pulse patterns obtained when the 5 neurons of FIG. 1(a) are excited by two different current stimuli: (0,0.4,0,0,0.4) and (0.4,0,0.4,0,0).

According to an example, a neural network is a non-biological network composed of artificial neurons in which pairs of neurons are connected by pairs of unidirectional synapses with different conductances. Synapses in a pair can be both inhibitory, both excitatory or one inhibitory with the other being excitatory for example. Typically, all such configurations are accessible using current technology, however the mutually inhibitory configuration is the most important for applications as it sustains coordination patterns. FIG. 1 is a schematic representation of a neural network according to an example in which five neurons are interconnected with mutually inhibitory synapses. It will be appreciated that more or fewer neurons will be present in a network according to an example. Typically, more neurons will be present.

Referring to FIG. 1, if neuron A fires, it blocks neuron B from firing and vice versa—when neuron B fires it blocks neuron A. The alternate firing of neurons A and B produces stable oscillations that underpin the oscillations of central pattern generators in the natural world, for example the beat of a leech's heart. Accordingly, when N neurons are connected together through mutually inhibitory synapses, the neurons similarly compete to fire in turn. Neural activity bounces from one neuron to the next in the network, with the firing sequence describing a trajectory within the network whose path is specified by the input stimulus, that is the input currents stimulating the network.

In the example of FIG. 1, five neurons are interconnected via mutually inhibitory synapses. Electrical activity bounces from one neuron to the next producing spatio-temporal sequences of voltage pulses. Two of these sequences are shown in FIGS. 1(b) and 1(c), that correspond to two different current stimuli and which thus depict two examples of coordinated pulse patterns obtained when the 5 neurons of FIG. 1(a) are excited by two different current stimuli: (0,0.4,0,0,0.4) and (0.4,0,0.4.0.4,0).

In an example, a network such as that described with reference to FIG. 1 can be implemented in hardware using various neuron models. Typically, the choice of neuron model will take into account whether there is compatibility in the technology used to implement a neuron and that of the desired system as a whole in order to enable easy integration of networks on a chip and the scaling down of large networks for example. Furthermore, it is typically advantageous that parameters for controlling threshold voltages, ion channel conductances and time delays for example in a neuron have equivalent quantities in real (biological) neurons. This enables the quantitative modelling of biological central pattern generators (CPGs) with CPG hardware. The accurate simulation of biological CPGs is important for making prosthetic devices capable of coordinating motor activity, such as pacemakers, and for developing medical therapies based on neuroelectrical stimulation as a substitute to drug treatments. It is further noted that a neuron is extendable by incorporating additional ion channels such as calcium or inwardly rectifying potassium which can enable accurate modelling of the most complex neurons such as those of mammals and birds.

Figure 2:
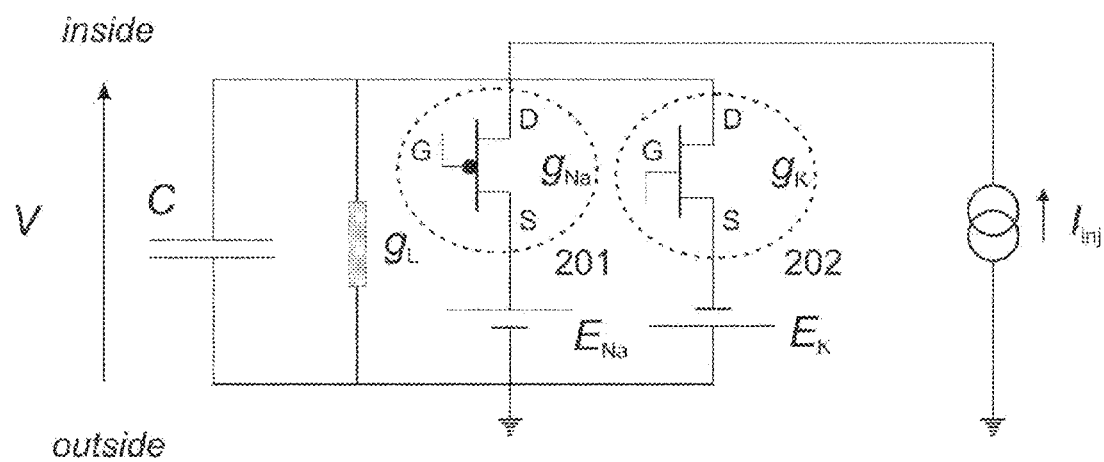
FIG. 2 is a schematic representation of an electronic neuron membrane according to an example.

FIG. 2 is a schematic representation of a neuron membrane according to an example. The transistors labelled 202 and 201 are n-type and p-type MOSFETs respectively whose drain-to-source conductances model the conductances of a potassium channel ($g_K$) and a sodium ion channel ($g_{Na}$). MOSFETs 201 and 202 are part of the sub-circuits depicted in FIGS. 3 and 4 which control the opening and closing of these ion channels, and which will be discussed in more detail below.

In an example, the conductance of the potassium channel is $g_K = \bar{g}_K n^4$ where n is an activation variable that opens the potassium channel as the membrane voltage V becomes greater than a threshold voltage $V_n$. $\bar{g}_K$ is the maximum conductance of the fully open channel. The conductance of the sodium channel is $g_{Na} = \bar{g}_{Na} m^3 h$ where m is another activation variable that opens the sodium channels when $V > V_m$, whereas h is an inactivation variable that closes the channel when $V > V_h$. The time evolution of the membrane voltage is typically given by the Hodgkin-Huxley equation which derives from analysis of the neuron membrane circuit in FIG. 2, and which can be expressed as:

$$C\frac{dV}{dt} = g_{Na}m^3h(E_{Na} - V) + g_Kn^4(E_K - V) + g_L(E_L - V) + I_{inj}(t)$$

The activation and inactivation variables:

$$(a_i) \equiv (m, h, n) \; i = 1, 2, 3$$

follow first order dynamic equations of the type:

$$\frac{da_i}{dt} = \frac{a_{i0} - a_i(t)}{\tau_i}$$

$$\text{where } a_{i0}(V) = \frac{1}{2}\left[1 + \tanh\left(\frac{V - V_i}{dV_i}\right)\right]$$

Figure 3:
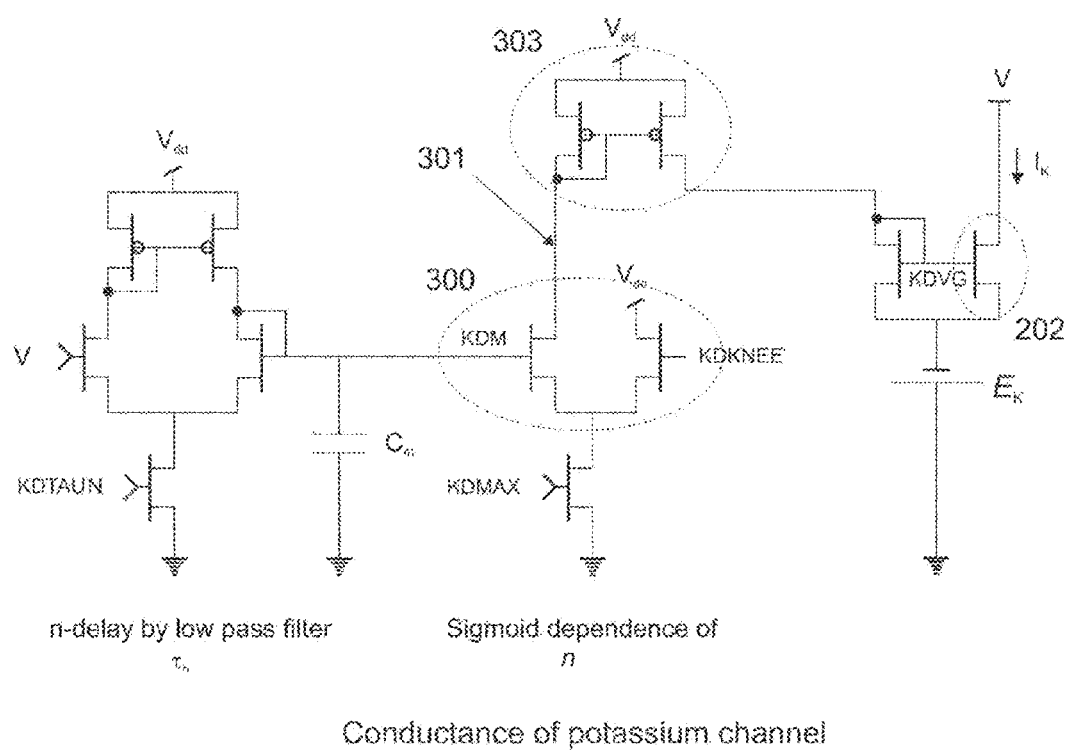
FIG. 3 is a schematic representation of a circuit to control the conductance of the potassium channel of the membrane of FIG. 1 according to an example.
Figure 4:
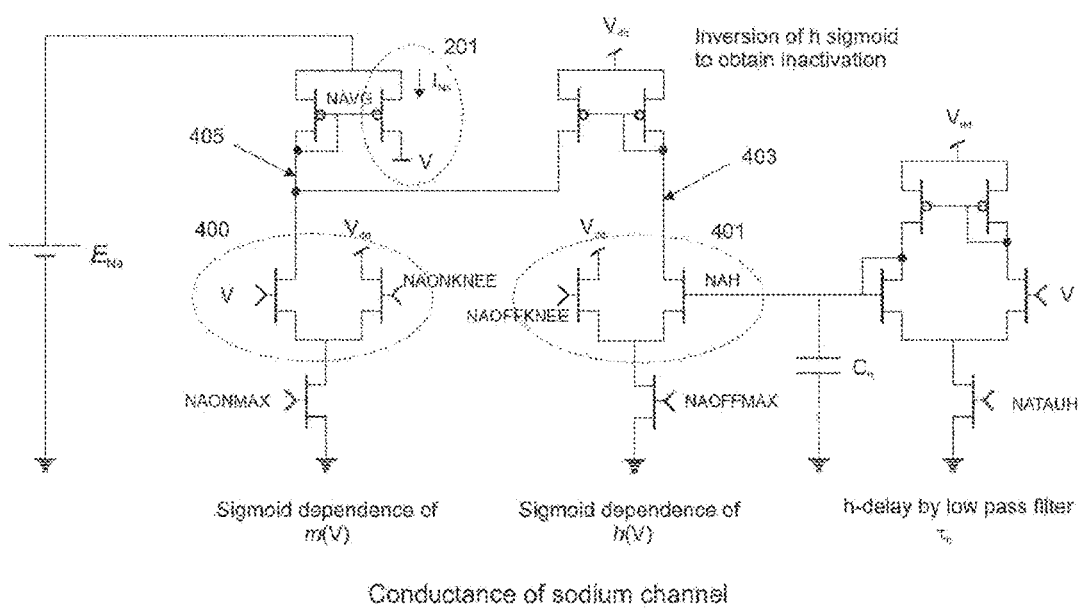
FIG. 4 is a schematic representation of a circuit to control the conductance of the sodium channel of the membrane of FIG. 1 according to an example.

The opening or closing of channels is described by the sigmoid response function $a_{i0}(V)$ modelled in the circuits depicted in FIGS. 3 and 4 by n-channel MOSFET pairs 300, 400 and 401. The time constants $\tau_h$, $\tau_n$ are obtained using low pass filters. The time constant $\tau_m$ is very small in real neurons and can be assumed to be zero. This implies that the Na channels open as soon as the membrane depolarizes. In an example, both the ground of level of the neuron circuit and $E_K$ are set at 1.5V above the ground level of the synapse. $E_{Na} = 6.5V$ (also relative to ground level of the synapse).

FIG. 3 is the schematic representation of the circuit that controls the potassium channel conductance. The MOSFET labelled 202 in this figure is the same as the one with that label in FIG. 2. KDKNEE is the threshold voltage at which the potassium channel opens, that is $V_n$. The channel opening is delayed by the follower integrator low pass filter seen at the left of the figure that provides time delay $\tau_n$. $\tau_n$ is tuned by changing the charging rate of the capacitor $C_m$ with the current source KDTAUN. KDMAX indirectly sets the saturation value of the potassium conductance $\bar{g}_K$. This is because the sigmoid current along 301 is mirrored by the p-type current mirror 303 to control the drain-source conductance $g_K$ of MOSFET 202. The resulting drain-source current through transistor 202 is therefore $I_K = g_K n^4 (V - E_K)$. In an example the ground of level of this circuit is 1.5V and $V_{dd} = 6.5V$.

Referring to FIG. 4, the circuit models the conductance of the sodium current. The MOSFET labelled 201 in this figure is the same as the one with that label in FIG. 2. The initial depolarization of the neuron membrane is accompanied by a rapid inflow of Na ions. This is why the opening of the Na ion channel is assumed to be instantaneous, hence $\tau_m = 0$. NAONKNEE is the voltage threshold at which the gate opens, that is $V_n$, and NAONMAX determines the maximum value of $\bar{g}_{Na}$. After some time delay, $\tau_h$, the inactivation gate of the Na channel begins to close. This delay is modelled by the low pass filter whose integration time is controlled by NATAUH. The channel begins to close when the membrane voltage exceeds the voltage threshold NAOFFKNEE, that is $V_h$. Both NAONMAX and NAOFFMAX control the saturation value of $\bar{g}_{Na}$.

The sigmoid inactivation current along 403 is mirrored by a p-MOSFET pair which effectively inverts it to obtain inactivation. Current along 405 is the difference between the activation current drawn by the pair 400 minus the activation current drawn by the pair 401. The current difference achieves the antagonist action of the m and h variables respectively. The current controls the conductance of the sodium channel represented here and in FIG. 2 by MOSFET 201. The drain-source current through MOSFET 201 hence models: $I_{Na} = g_K m^3 h (V - E_{Na})$. In an example the ground of level of this circuit is 1.5V and $V_{dd} = 6.5V$ relative to the ground level of the synapse.

Figure 5:
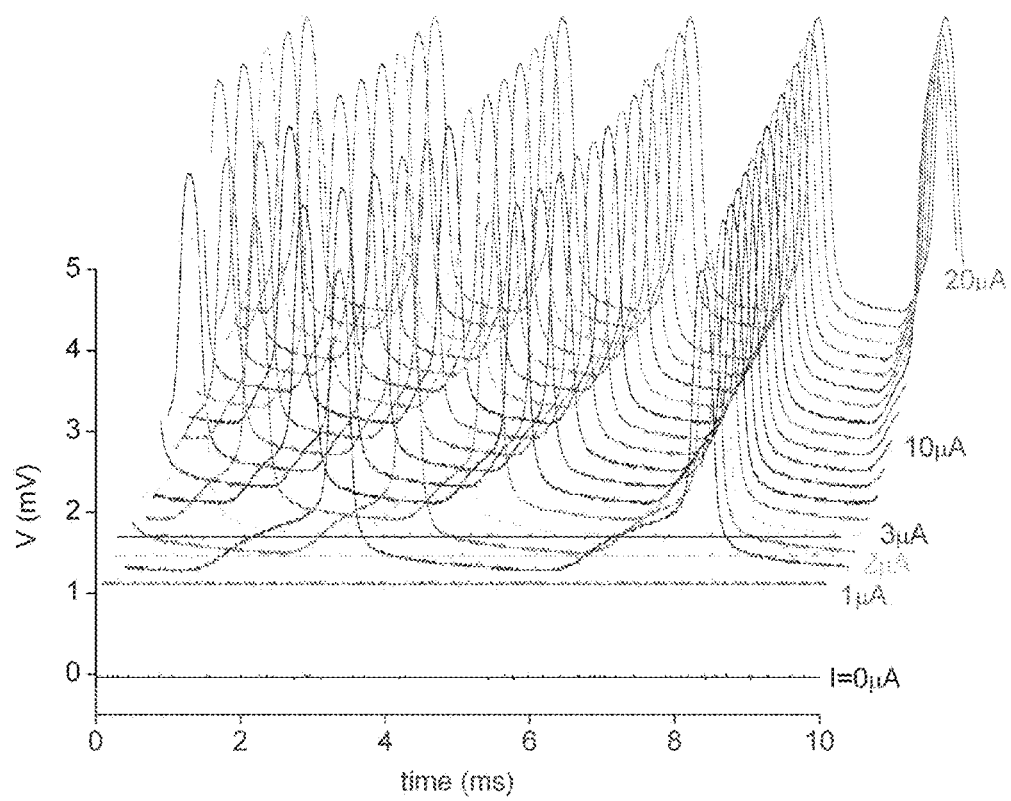
FIG. 5 shows the typical response of the neuron circuit (FIGS. 2-4) to increasing current excitation $I_{inj}$.

FIG. 5 shows the excitatory response of the neuron according to an example. A neuron starts firing at a threshold current value and fires at a faster rate when the current increases. This property enables a CPG pacemaker to adapt its pace to the stimulus—for instance physical exercise.

FIG. 6(a) is a schematic representation of a circuit for a gap junction synapse according to an example. The gap junction synapse injects into the post-synaptic neuron a current proportional to the voltage difference between the membrane voltages of the pre- and post-synaptic neurons $V_1$ and $V_2$:

$$I_{1 \to 2} = g(V_1 - V_2)$$

In an example, the constant of proportionality, g is the conductance of the synapse which represents the strength of the coupling between neurons. A value of g>0 corresponds to an excitatory synapse as an increase in the pre-synaptic potential $V_1$ relative to $V_2$ injects a positive current in the post-synaptic neuron. A value of g<0 corresponds to an inhibitory synapse as increasing the pre-synaptic voltage decreases the injected current.

According to an example, and as depicted in FIG. 6(a), the gap junction synapse is implemented in hardware using a differential current amplifier. The current amplifier receives as input the membrane voltages of the pre- and post-synaptic neurons. The n-type MOSFET pair produces drain-source currents $I_1$ and $I_2$ controlled by $V_1$ and $V_2$ respectively. In particular $I_1=I_2$ when $V_1=V_2$. Both currents are mirrored by their respective p-type MOSFET pairs. The extra pair of n-type MOSFETs labelled 501 inverts $I_2$ so that the output current $I_{out}=I_1-I_2$. Naturally, $I_{out}=0$ when $V_1=V_2$. $V_1$ has the effect of increasing $I_1$ whereas $V_2$ decreases $I_{out}$. The absolute intensity $I_{out}$ is controlled by the current source MOSFET through its gate voltage Vmax. Hence the circuit models the gap junction synapse with a tuneable conductance:

$$I_{OUT}=g(V_1-V_2),$$

Excitation or inhibition is obtained by feeding the output current into the pre- or the post-synaptic neuron as appropriate. According to an example, there are 4 combinations:

$I_{\to 1}=g(V_1-V_2)$ neuron 2 inhibits neuron 1
$I_{\to 2}=g(V_1-V_2)$ neuron 1 excites neuron 2
$I_{\to 2}=g(V_2-V_1)$ neuron 1 inhibits neuron 2
$I_{\to 1}=g(V_2-V_1)$ neuron 2 excites neuron 1

In an example, the ground of level of this circuit is 0V and $V_{dd}=8V$. It is desirable to set the ground level of the synapse below the ground level of the neuron (1.5V) and the supply voltage of the synapse above the supply voltage of the neuron (6.5V) to enable correct operation of the differential amplifier in the range of variation of the membrane voltage.

The typical response of the gap junction synapse is shown in the plots of FIG. 6(b). Each curve was measured as a function of $V_1$ while holding $V_2$ constant. FIG. 6(b) shows that the output current changes sign at $V_1=V_2$. This crossover shifts to higher $V_1$ when $V_2$ increases. The effect of increasing Vmax is shown from one graph to the next in FIG. 6(b). For the current to reverse sign, the Vdd of the synapse must be held slightly above the Vdd of the neuron, such as 1-2V higher for example, and similarly the ground level of the synapse should be slightly below the ground level of the neuron. In an example, the Vdd of the synapse is 8V, its ground level is 0V and the membrane voltage oscillates between 1.5V and 6.5V. The four voltage levels depicted in FIG. 6(b) are obtained by applying 8V between: a 100 Ohm resistor in series with a Zener diode with 5V reverse voltage in series with another 100 Ohm resistor.

According to an example, the conductance g of the synapse is controlled by the gate voltage of the current source labelled $V_{max}$ in FIG. 6(a). This controls the total current $I_1+I_2$. In an example, the conductance of individual synapses can be tuned from 0 to a several milliSiemens continuously.

Figure 6C:
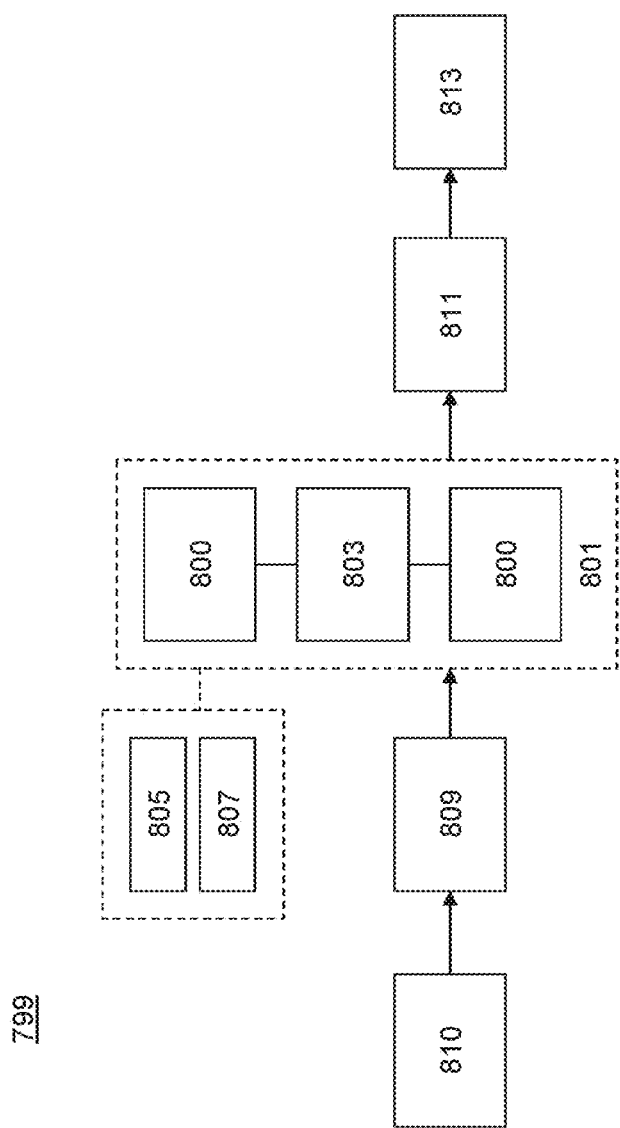
FIG. 6(c) is a schematic block diagram of a CPG according to an example.

FIG. 6(c) is a schematic block diagram of a CPG according to an example. CPG 799 includes a pair of interconnected neurons 801 forming a neural network, such as a non-biological neural network. That is, neurons 800 are connected using an inhibitory synaptic link 803. Multiple such pairs 801 can be provided for CPG 799, although only one pair is shown for clarity. Each neuron 800 includes multiple conductance components 805, 807. Components 805 and 807 can provide respective measures for the conductance of neuron membrane channels, such as sodium and potassium channels as described above.

An input 809 to the CPG is in the form of one or more input signals representing an input stimulus for the network 801. Multiple input signals 810 can be used to provide different stimuli to respective ones of the neurons 800. Overall, the input stimulus 809 represents the one or more input signals that can be applied to various components of the CPG 799.

Output 811 of the CPG is a signal which is a spatio-temporal sequence of rhythmic electric pulses which can be provided to an external system 813, such as any one of the systems described above. The output 811 is therefore a sequence of periodic electric pulses for use in an external system 813.

Figure 7:
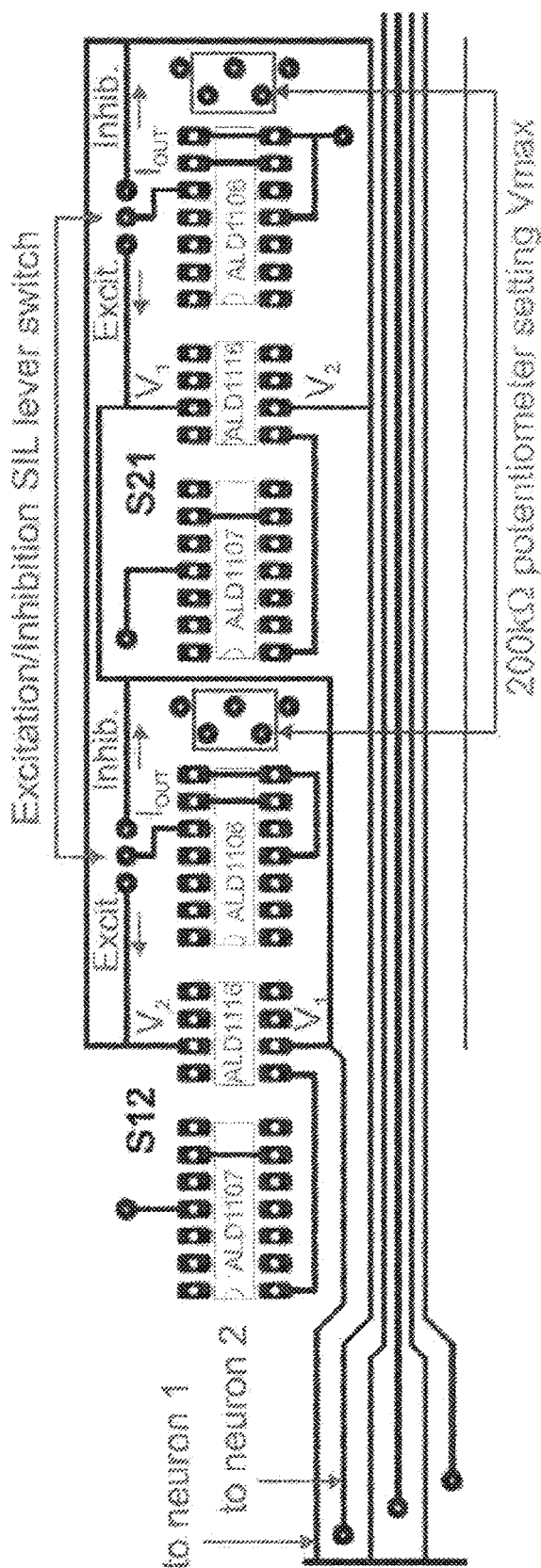
FIG. 7 is a schematic showing how a pair of synapses is implemented on the component side of a printed circuit board according to an example.

FIG. 7 is a schematic showing how a pair of synapses is implemented on a printed circuit board according to an example. FIG. 7 thus depicts how a pair of synapses can be connected in an example in order to allow for the flexibility of making each synapse inhibitory or excitatory at the flick of a switch. In the example, each synapse is implemented using, from left to right, one QUAD p-type MOSFET chip (ALD1107), one DUAL n-type MOSFET chip (ALD1116), one QUAD n-type MOSFET chip (ALD1106). ALD1107 contains the 2 p-type current mirrors, ALD1116 contains the n-type MOSFETs gated by $V_1$ and $V_2$, and ALD1106 contains the $V_{max}$ MOSFET and the 501 pair of FIG. 6(a). The membrane voltages $V_1$ and $V_2$ are input on pins 2 and 7 of ALD1107 whilst the output current emanates from pin 10 of ALD1106. The role of the SIL lever switch is to redirect the output current towards neuron 1 or 2 to achieve excitation or inhibition according to:

Left switch in right position, $I_{\to 1}=g(V_1-V_2)$, Neuron 2 inhibits neuron 1
Left switch in left position, $I_{\to 2}=g(V_1-V_2)$, Neuron 1 excites neuron 2
Right switch in right position $I_{\to 2}=g(V_2-V_1)$, Neuron 1 inhibits neuron 2
Right switch in left position, $I_{\to 1}=g(V_2-V_1)$, Neuron 2 excites neuron 1

FIGS. 8 to 15 are schematic representations showing 4 panels of a printed circuit board of a 6 neuron CPG according to an example. Each panel has a component side and a solder side as indicated in the figure captions. When the four panels are assembled, the hollow circles opposite to each other at the edges of the panels are wired together.

Figure 8:
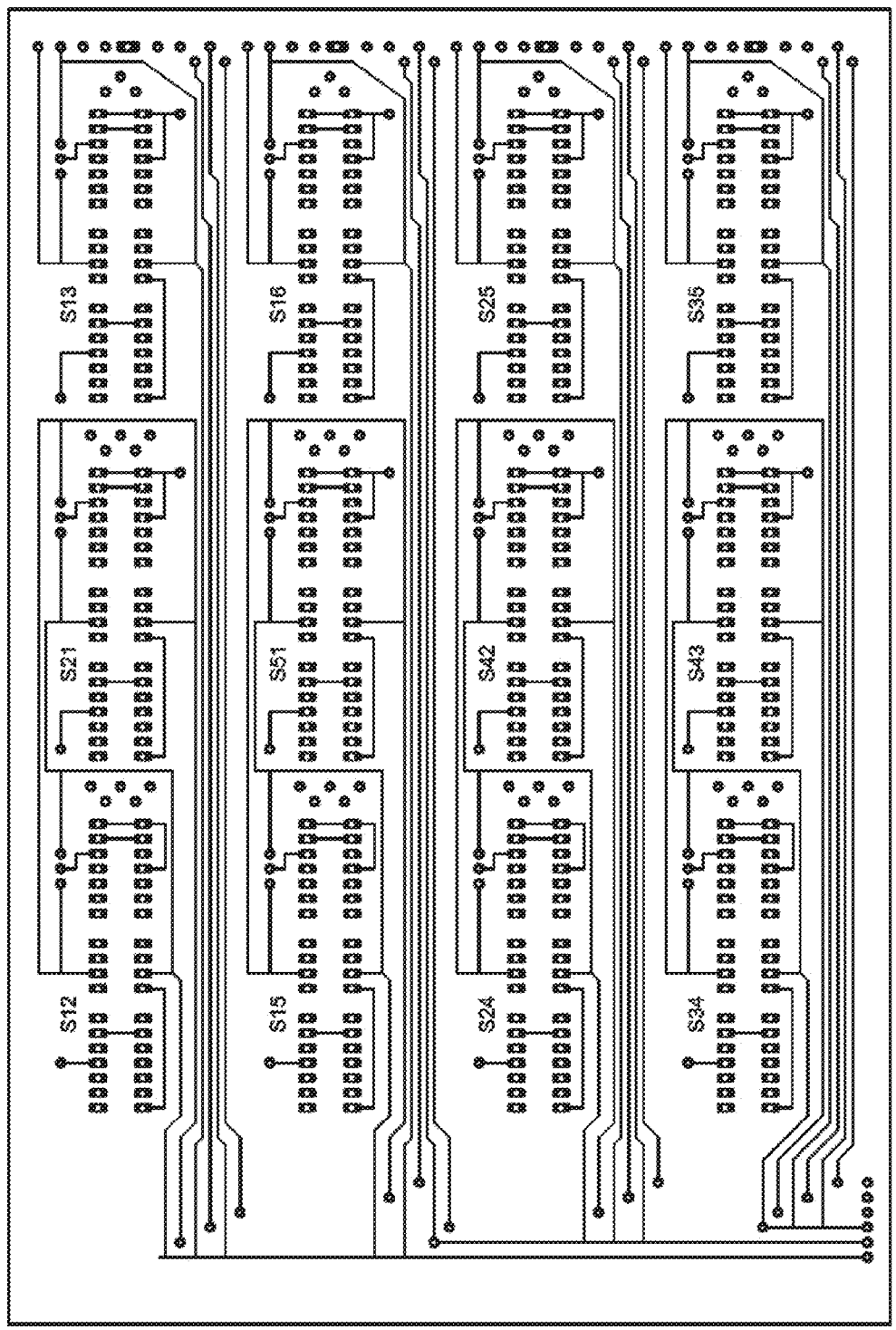
FIG. 8 is a schematic of the top left quadrant of the component side of a printed circuit board of a central pattern generator according to an example.
Figure 9:
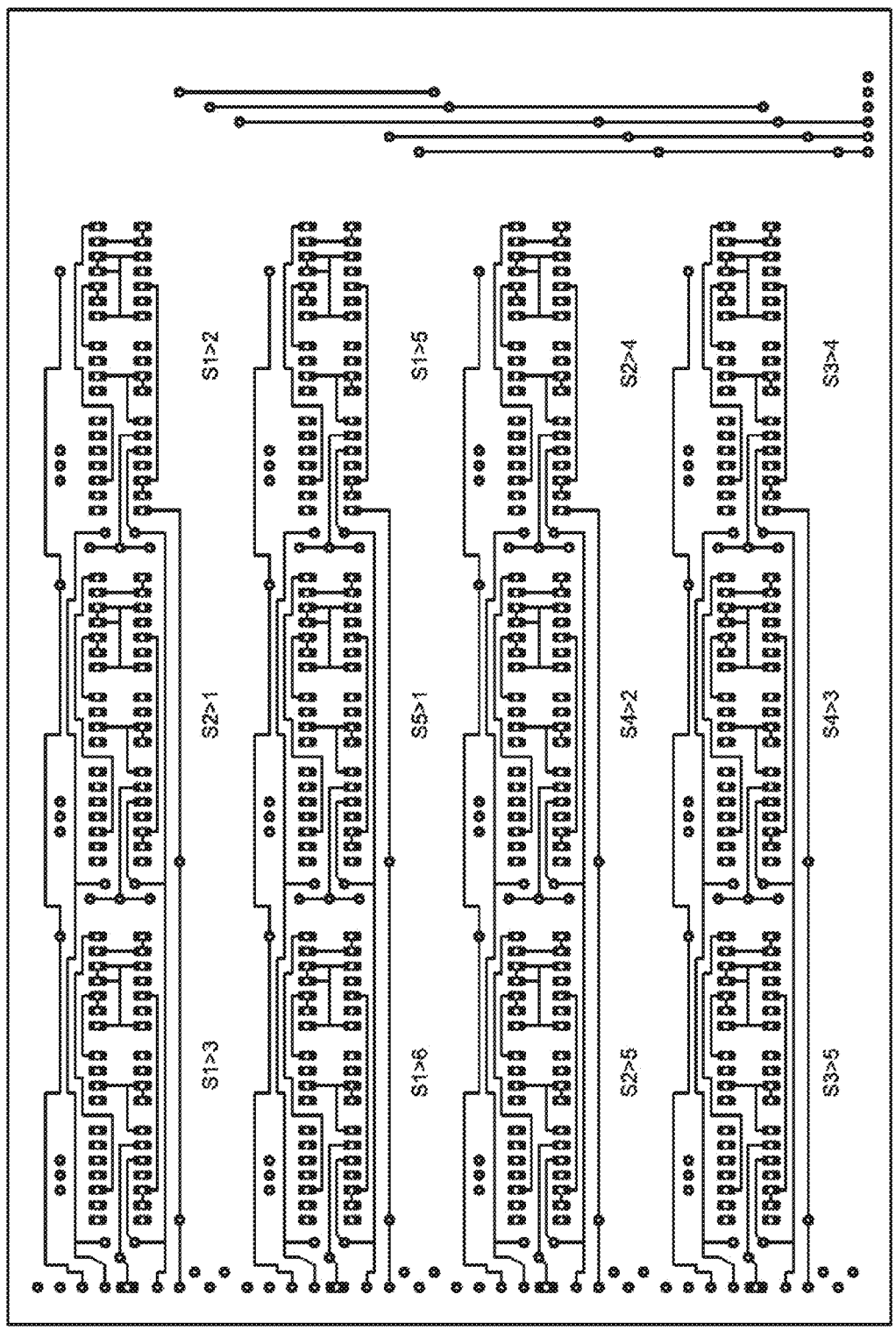
FIG. 9 is a schematic of the top left quadrant of the solder side of a printed circuit board of a central pattern generator according to an example.
Figure 10:
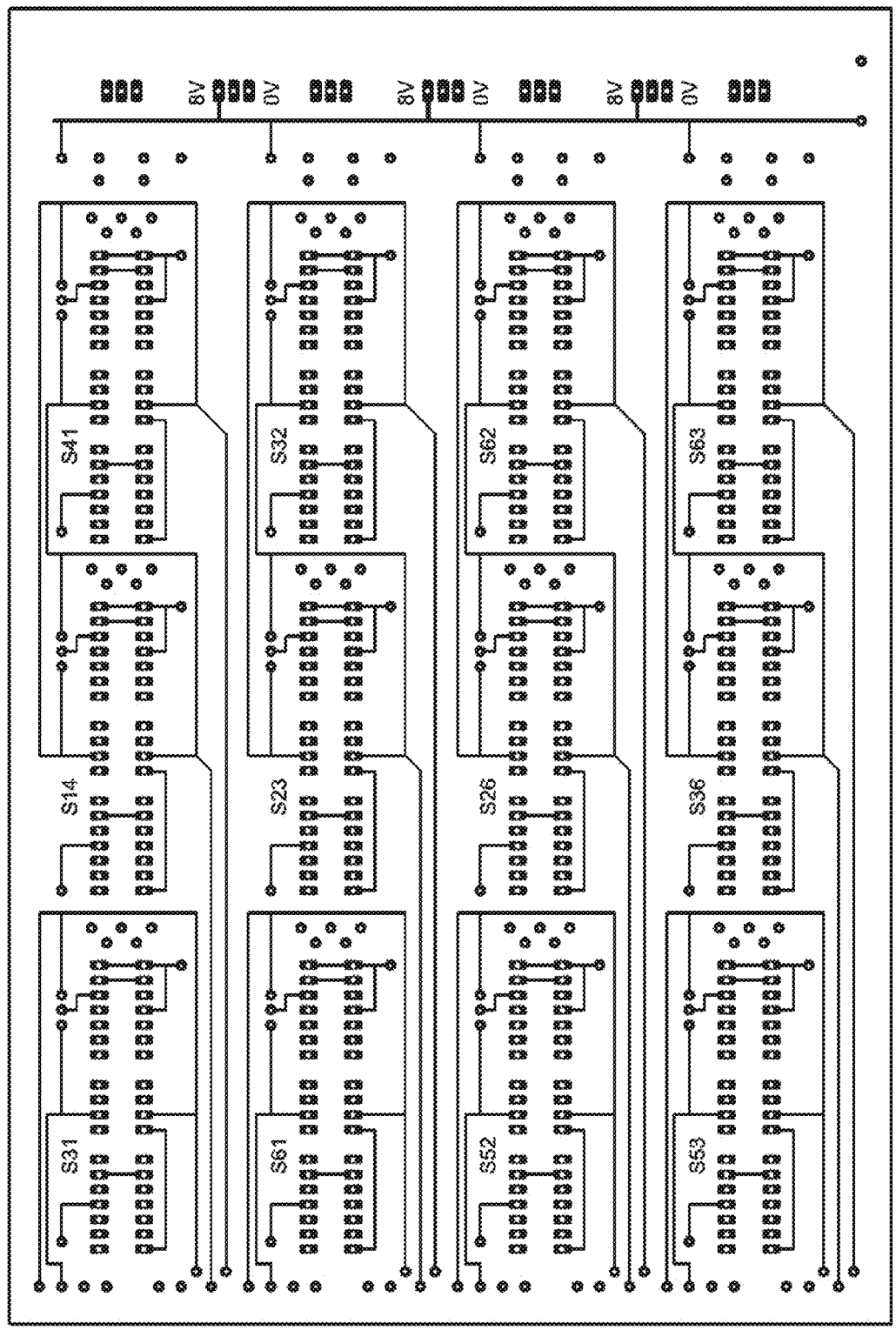
FIG. 10 is a schematic of the top right quadrant of the component side of a printed circuit board of a central pattern generator according to an example.
Figure 11:
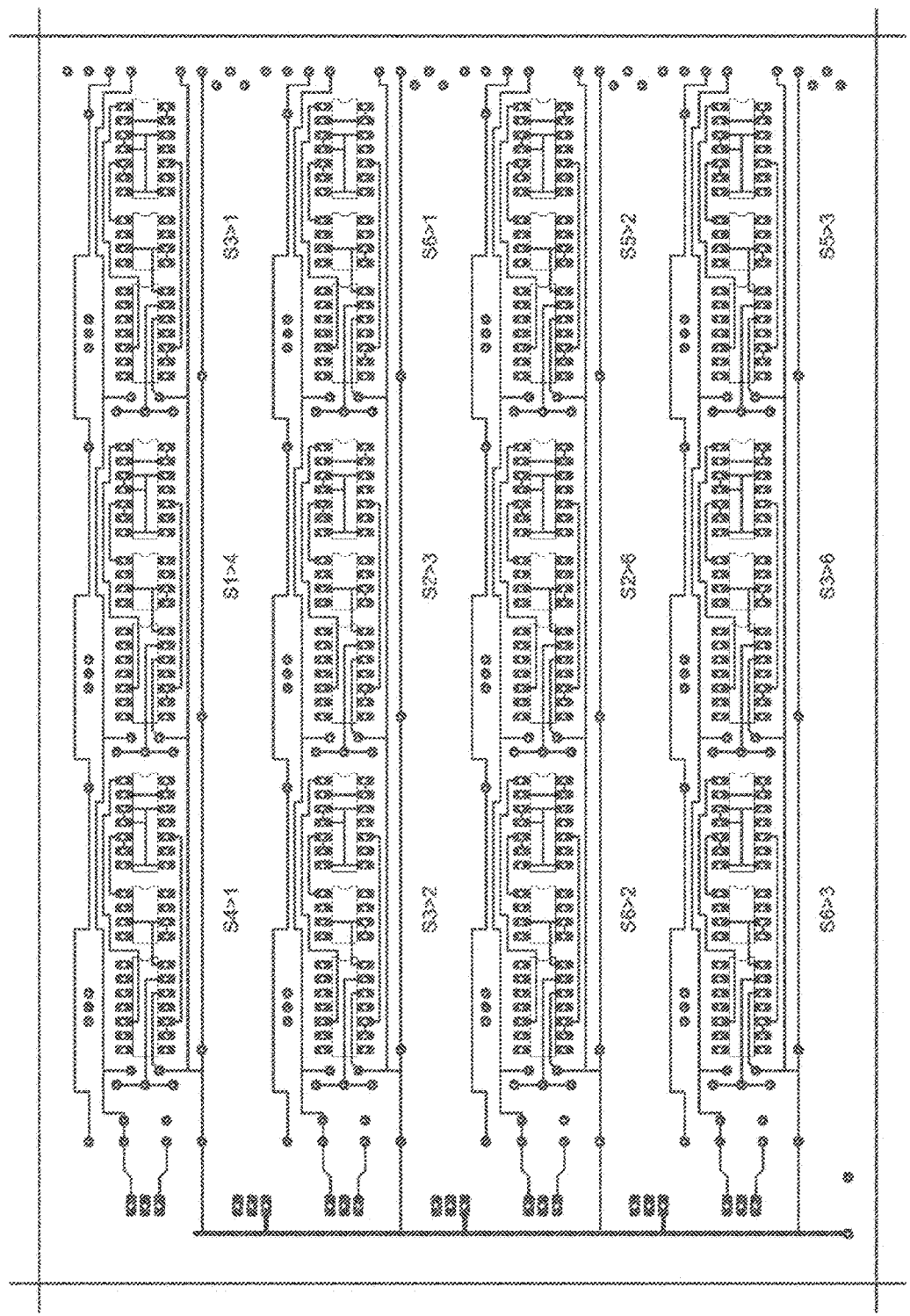
FIG. 11 is a schematic of the top right quadrant of the solder side of a printed circuit board of a central pattern generator according to an example.
Figure 12:
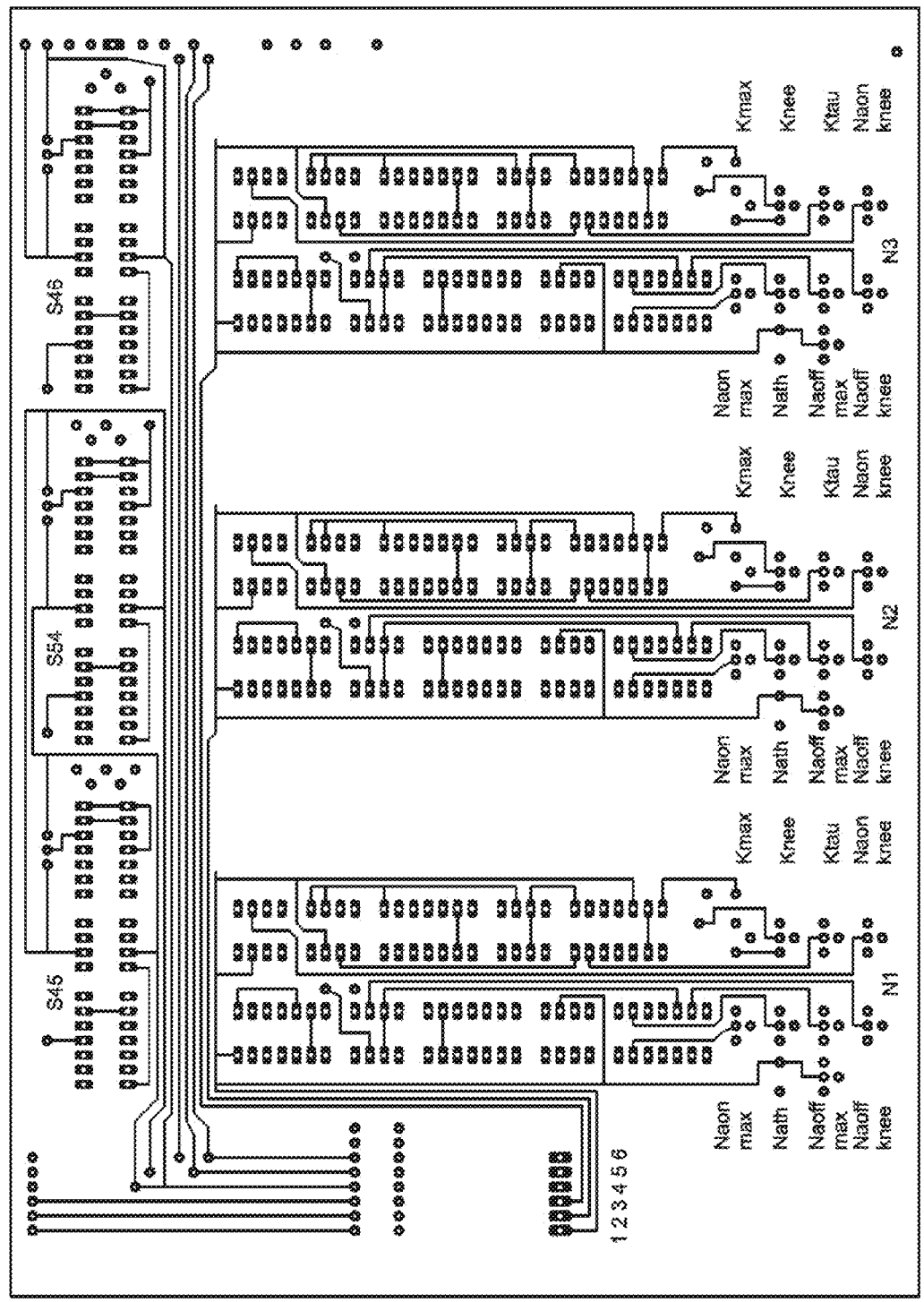
FIG. 12 is a schematic of the bottom left quadrant of the component side of a printed circuit board of a central pattern generator according to an example.
Figure 13:
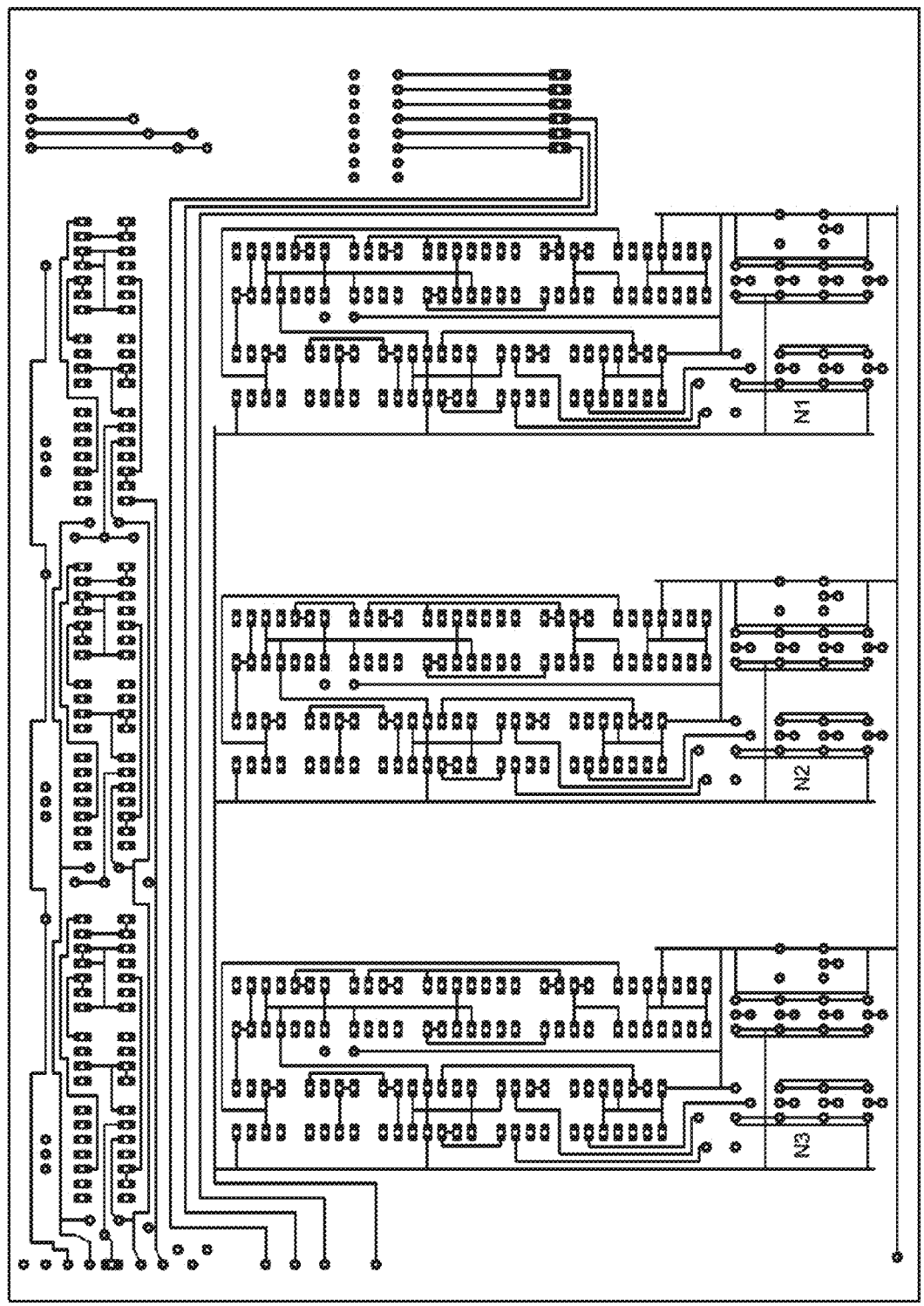
FIG. 13 is a schematic of the bottom left quadrant of the solder side of a printed circuit board of a central pattern generator according to an example.
Figure 14:
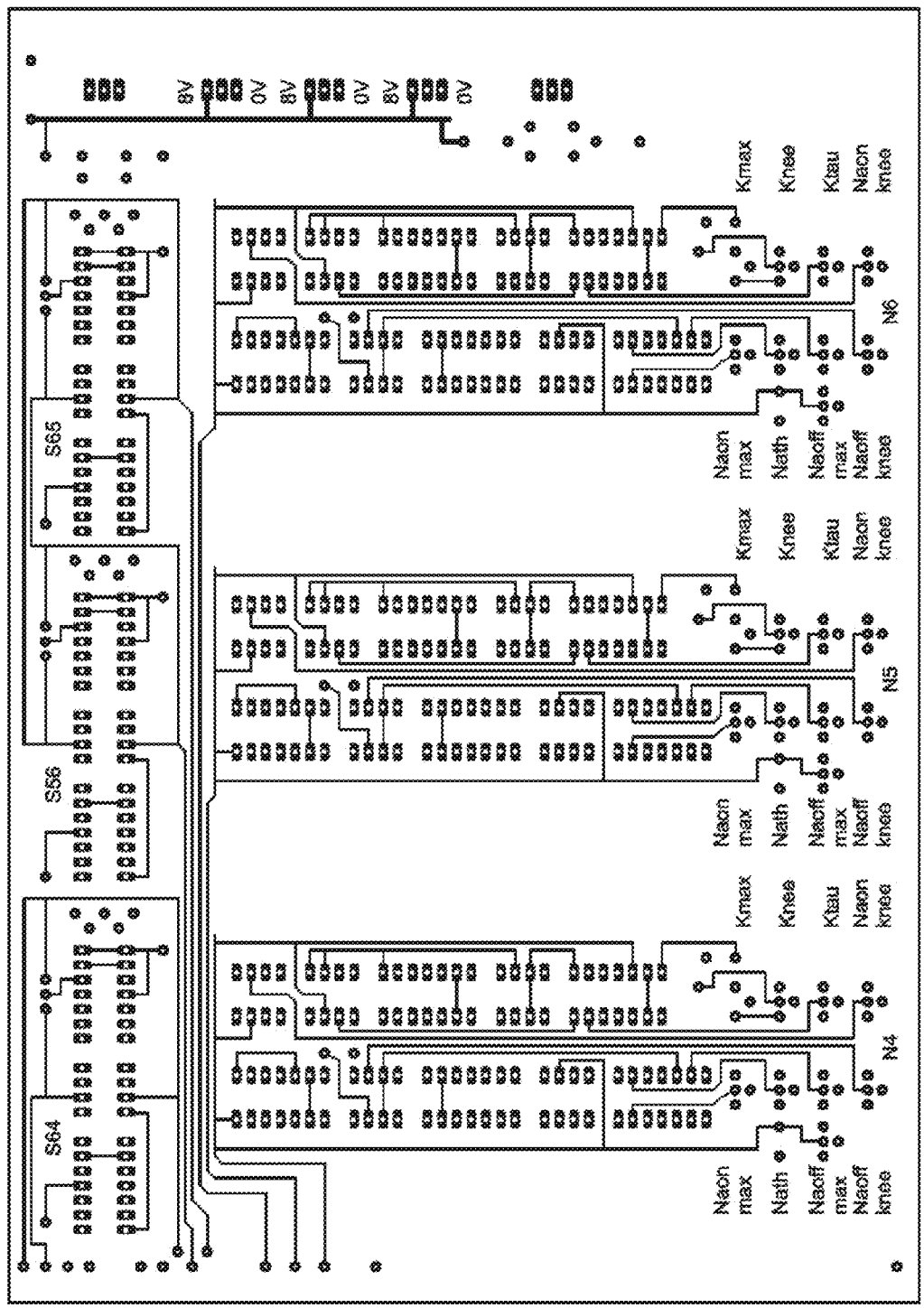
FIG. 14 is a schematic of the bottom right quadrant of the component side of a printed circuit board of a central pattern generator according to an example.
Figure 15:
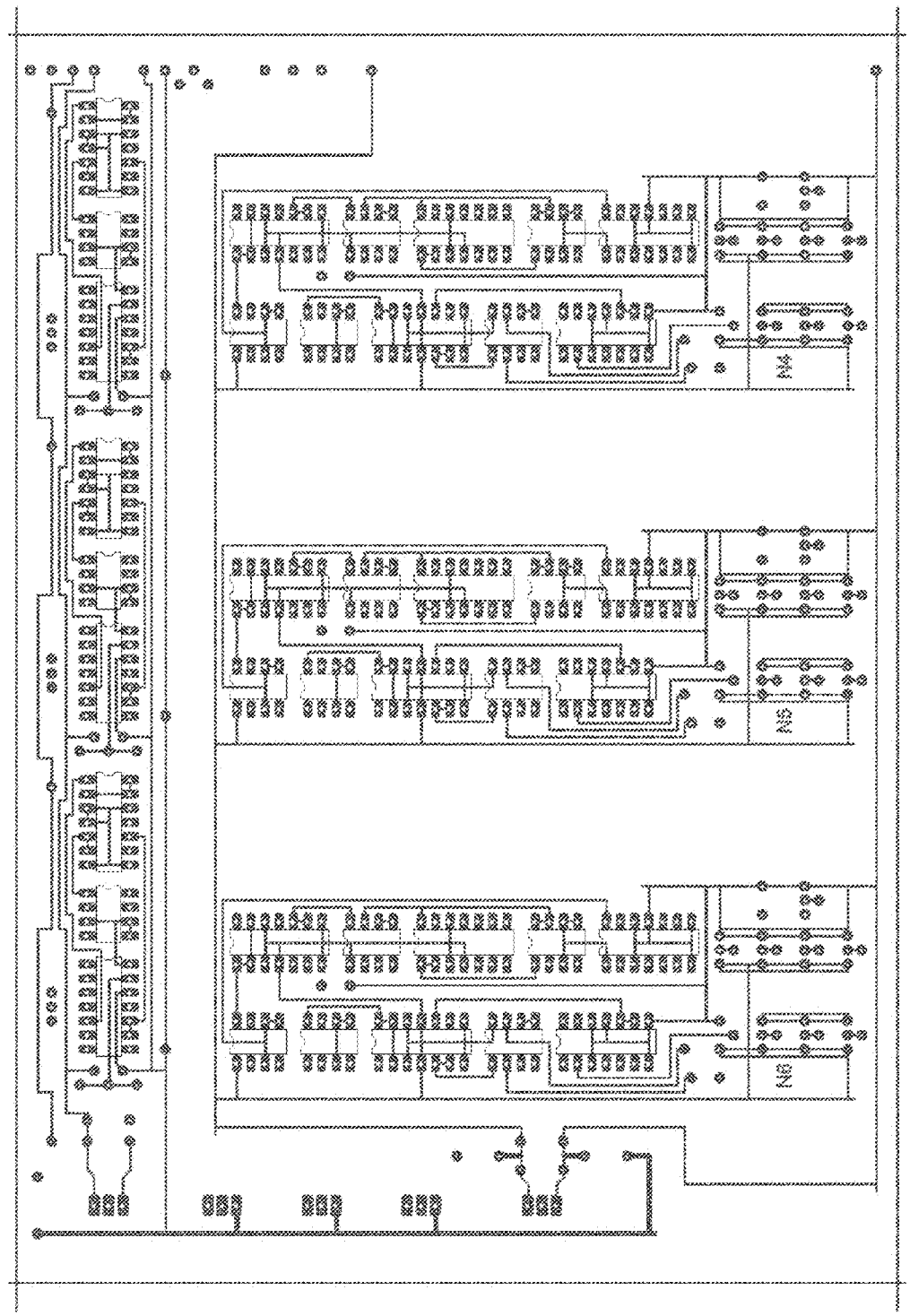
FIG. 15 is a schematic of the bottom right quadrant of the solder side of a printed circuit board of a central pattern generator according to an example.

FIG. 8 shows the top left quadrant of the printed circuit board of a central pattern generator according to an example—component side. FIG. 7 shows detail of FIG. 8; the same components are step-repeated over all synapses S12, S21, S13, ... S36, S63. FIG. 9 shows the top left quadrant of the printed circuit board of a central pattern generator according to an example—solder side. FIG. 10 shows the top right quadrant of the printed circuit board of a central pattern generator according to an example—component side; the same components used for S12 and S21 are step-repeated here for S31, S14, ... S36, S63. FIG. 11 shows the top right quadrant of the printed circuit board of a central pattern generator according to an example—solder side. FIG. 12 shows the bottom left quadrant of the printed circuit board of a central pattern generator according to an example—component side; the same components used for S12, S21 are step-repeated here in S45, S54, S46. The components on neurons N1-3 are step-repeated from N5 in FIG. 17. FIG. 13 shows the bottom left quadrant of the printed circuit board of a central pattern generator according to an example—solder side. FIG. 14 shows the bottom right quadrant of the printed circuit board of a central pattern generator according to an example—component side; the same components used for S12 and S21 are step-repeated here in S64, S56, S65. The components of neurons N4-6 are step repeated from N5 in FIG. 17. FIG. 15 shows the bottom right quadrant of the printed circuit board of a central pattern generator according to an example—solder side;

According to an example, interconnecting N neurons requires N(N−1) interconnects. Because this number can be very large, wiring the neurons together requires special attention. According to an example, there is provided a method that fits N(N−1) interconnects on two sides of a printed circuit board for a network of any size. In a first step, synapses are wired in bidirectional pairs $S_{ij}$ and $S_{ji}$ (0=1, 2 . . . N) as shown in FIG. 7. In a second step, tracks i and j are drawn from these pairs and connected to their respective neurons i and j. The second type of interconnect corresponds to the vertical wires at the left-hand side of FIG. 8, the right hand side of FIG. 9, the left-hand side of FIG. 12 and the right hand side of FIG. 13. The hollow circles that overlap on the component and solder sides of the PCB are connected together to enable the continuity of tracks from the component side to the solder side.

When scaling the circuit on a silicon chip, interconnects can be fabricated using a two-step planarization of polyimide according to an example. Via-holes can be made through a first polyimide layer to contact synapses. A first set of metal tracks can be fabricated starting from one pair of synapses as indicated by the vertical tracks on the solder side tracks of the PCB. The chip can then be coated with a second layer of polyimide. Via holes can contact the neuron at one end and connect either the track terminations noted above or the neuron pairs as indicated by the vertical tracks on the component side of the PCB.

According to an example, a network of 5 neurons displays the following matrix of conductances:

$$[g] \equiv \begin{bmatrix} & g_{12} & g_{13} & g_{14} & g_{15} \\ g_{21} & & g_{23} & g_{24} & g_{25} \\ g_{31} & g_{32} & & g_{34} & g_{35} \\ g_{41} & g_{42} & g_{43} & & g_{45} \\ g_{51} & g_{52} & g_{53} & g_{54} & \end{bmatrix}$$

The values are programmed by setting the gate bias of the $V_{max}$ MOSFET in FIG. 7. In this way any spatio-temporal coordination pattern can be obtained.

According to an example, a non-biological asynchronous neural network system composed of neurons interconnected as described above has a multitude of uses. For example, a network can be used as a central pattern generator (CPG) to provide rhythmic patterned outputs without sensory feedback. Accordingly, a spatio-temporal sequence of rhythmic electric pulses can be provided to coordinate complex motor activity.

For example, current pacemakers stimulate the sino-atrial node of the heart with periodic voltage pulses. This triggers a wave of electrical activity that propagates through the heart leading to the contraction of heart chambers in the conspicuous PQRST sequence seen in electrocardiograms. In several ischemic and non ischemic cardio-myopathies, the normal cardiac activity is disturbed. This leads to asynchronous contraction and reduced pump efficiency which may progress to heart failure. In such cases an advanced pacemaker including a CPG according to an example can reverse the process of heart failure and improve quality of life because the timed electrical impulses produced by the neurons in the CPG implant would continue to coordinate the contraction of the heart chambers. The mutually inhibitory pairs of neurons inside the CPG can produce the regular oscillations needed to control the heart rhythm. Here neuronal oscillators have the advantage of being able to adapt their pace to the level of activity of the body, as required by the heart during exercise. This is because the natural excitability of neurons makes the CPG oscillate at a pace that increases with the intensity of the stimulus. A CPG pacemaker has the ability to synchronize to respiration or other rhythms in the body to improve blood pumping efficiency and prevent heart failure. Such synchronization is known to be strong in athletes while its absence typically manifests as sleep apnoea, arrhythmia and heart failure. In the natural world, many invertebrates (e.g. the leech) use CPGs as cardiac pacemakers. Accordingly, the key advantages of CPG hardware over current pacemakers are:

Coordination of the 4 heart chambers;
Ability to synchronize to other body rhythms, in particular respiration, that modulate the heart beat to improve blood pumping efficiency;
Adaptability of the CPG pace to the stimulus e.g. the level of exercise;
The power consumption is considerably lower than digital chips (/1000); and
The technology is eminently scalable in CMOS.

More generally, CPG hardware according to an example is able to encode sequences of motor activity in complex spatio-temporal patterns of electrical pulses. Neuroelectric stimulation is a therapy that is increasingly being used as a substitute to drug treatments for instance in the treatment of epilepsy or tinnitus through vagus nerve stimulation and in the re-education of stroke patients through neuromuscular stimulation. CPGs are equally well suited to coordinating motor activity in prosthetic devices such as timing the strokes of heart chambers in advanced pacemakers, coordinating the movement of prosthetic limbs and concatenating the phonemes of speech synthesizers.

Speech synthesis is based on the concatenation of pieces of recorded speech that are stored in a database. A challenge facing voice synthesizers is that many spellings in English for example are pronounced differently depending on context. For this reason, concatenating the phones of individual vowels and consonants is often insufficient to form intelligible sentences. This is why current speech processors require the recording of entire words or sentences which limits their commercial use to very specific situations. A CPG network according to an example can improve on this by providing a programme for coordinating the movements of the mouth, tongue, vocal cords, lungs to combine phones into words and words into sentences. The output of the network need not be a physical vocal track but could be one of the computational models of the human vocal track which have been developed within the so called articulatory approach to speech synthesis. This approach gives complete control of all speech parameters and has been the most successful in conveying intonations, such as questions, statements as well as emotions. A CPG network according to an example can therefore be well suited as the High Vocal Centre of speech synthesizers enabling the conversion of text into intelligible sentences.

Figure 16:
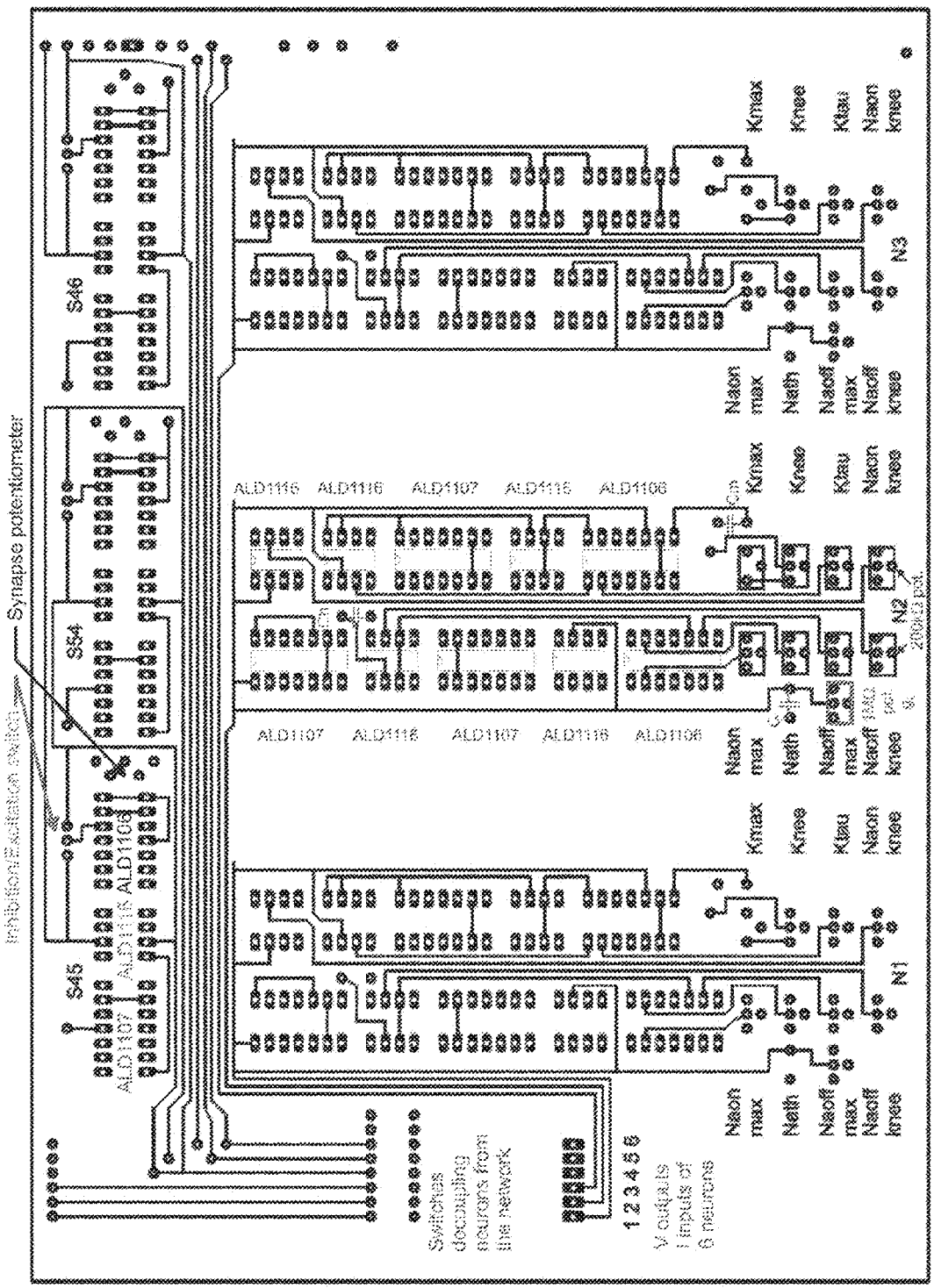
FIG. 16 a schematic which shows some detail of components mounted on the printed circuit board of FIG. 12 as an example of a practical implementation.

FIG. 16 is a schematic which shows the detail of components mounted on the printed circuit board of FIG. 12 as an example of practical implementation. Certain components are added for the example. These components are identical from one neuron to the next and similar for similar synapses.

Figure 17:
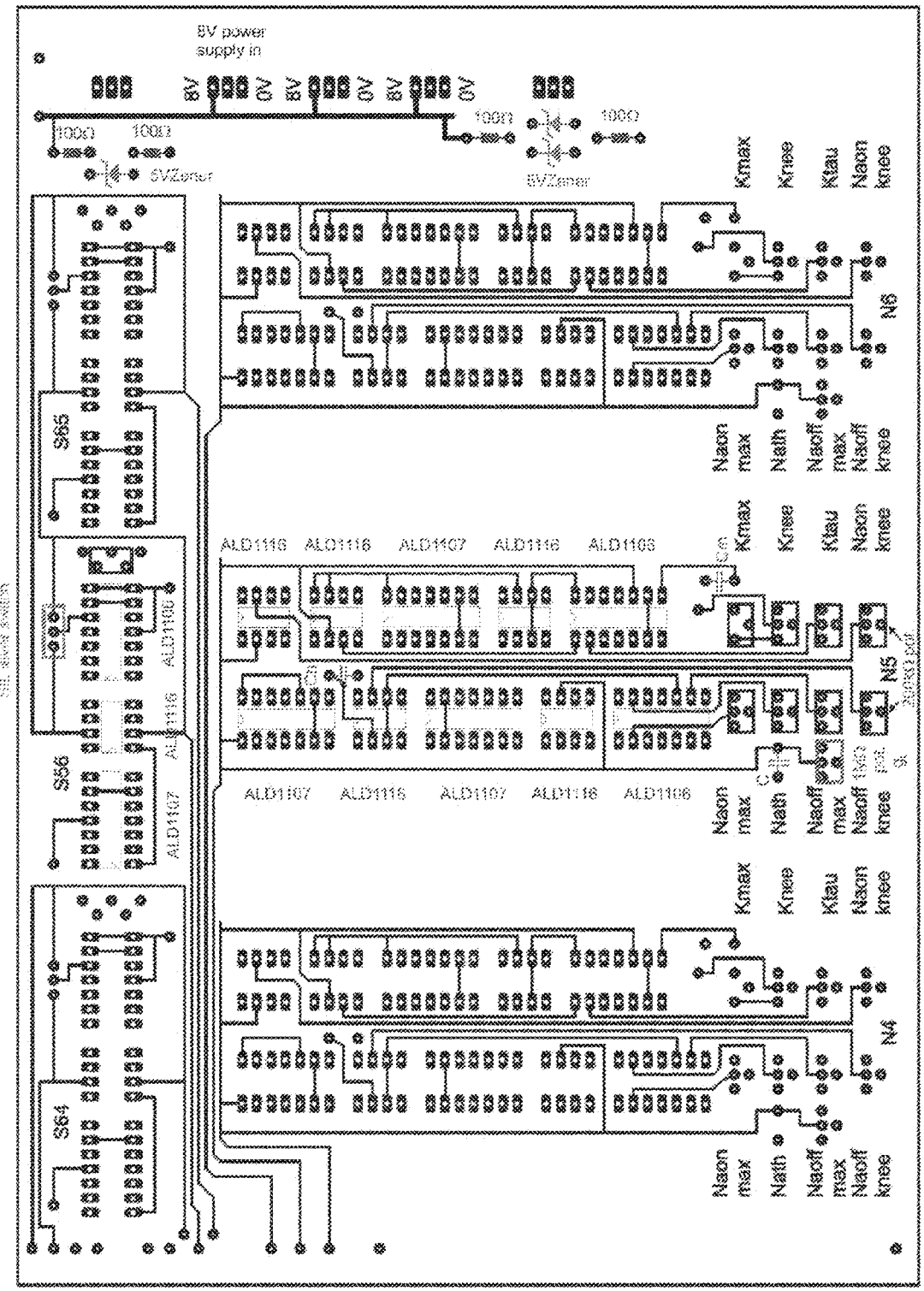
FIG. 17 a schematic which shows the details of components mounted on the printed circuit board of FIG. 14 as an example of a practical implementation.

FIG. 17 shows the details of components mounted on the printed circuit board of FIG. 14 as an example of practical implementation. The components that remain unlabelled are step repeated given that the 6 neurons are identical and the 30 synapses are also identical. The components noted show how the neurons and synapses are supplied with regulated voltages 0V, 1.5V, 6.5V and 8V.

Figure 18:
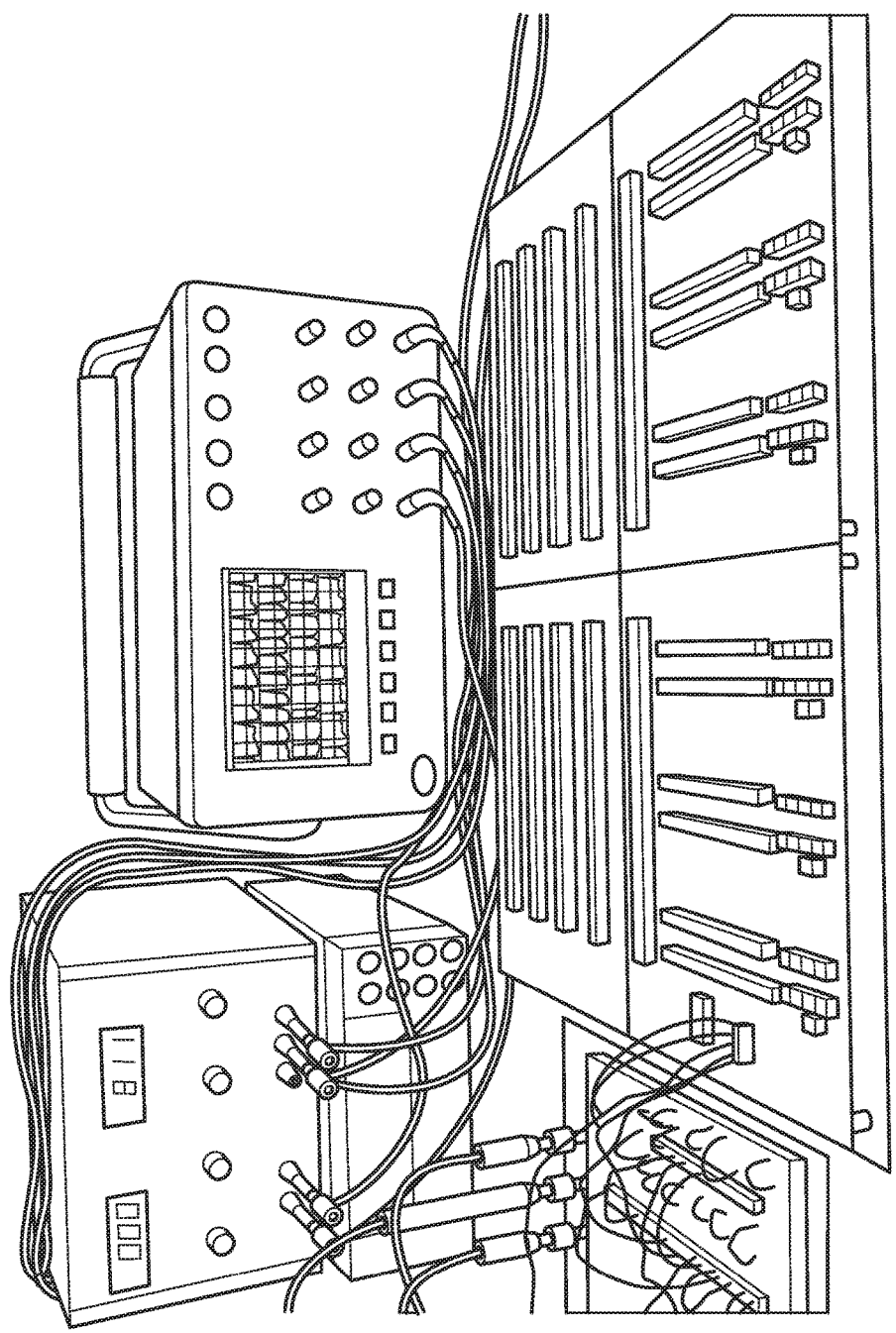
FIG. 18 shows a test central pattern generator in operation according to an example.

FIG. 18 shows test CPG hardware in operation according to an example. The network comprises 6 neurons in the lower part of the board and an array of 5×6 synapses in the upper part. The neuron oscillations seen on the oscilloscope screen develop a spatio-temporal pattern which is typical of that obtained when 4 neurons are put in competition with each other through mutually inhibitory synapses. In the example, the neuron settings were as follows:

NAONMAX=3.73V
NATH=1.40V
NAOFFMAX=2.98V
NAOFFKNEE=2.85V
KMAX=3.11V
KNEE=1.20V
KTAU=1.02V
NAONKNEE=1.253V
$g_L$=0.01 mS
C=10 nF
$C_n$=100 nF
$C_h$=10 nF

The voltage levels quoted here are relative to the ground level of the neuron (not that of the synapse). With these parameters, neuron oscillations start at a current threshold $I_{inj}$=80 µA. By increasing the current further the frequency of oscillations was increased from 200 Hz at the threshold to typically 1 kHz with $I_{inj}$=500 µA current. The current threshold can be reduced by decreasing $g_L$. This is a desirable goal to achieve when scaling the CPG on an integrated circuit.

Figure 19:
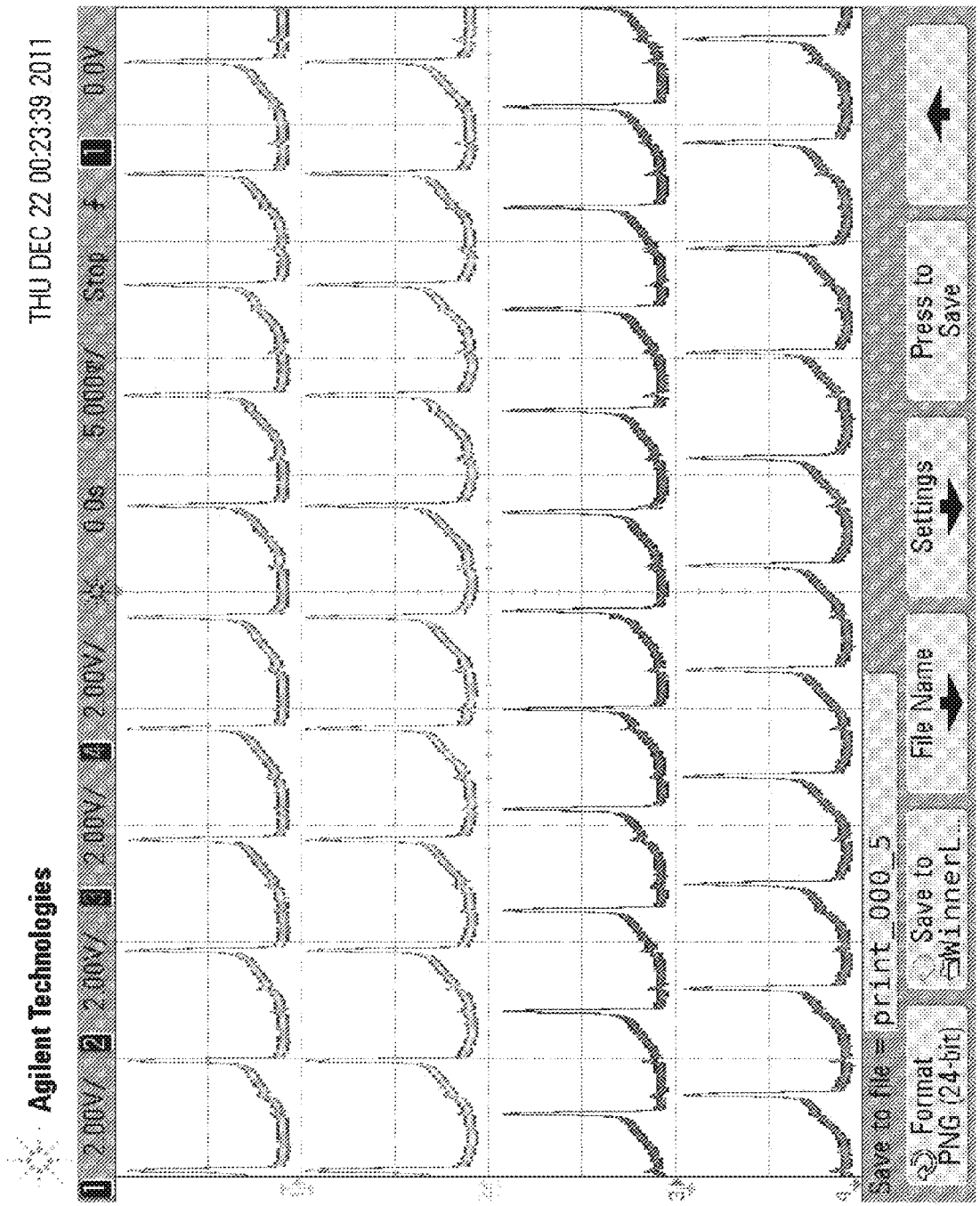
FIG. 19 is a set of plots to show in-phase synchronization of two neurons as they interact through mutually excitatory synapses according to an example.

FIG. 19 is a set of plots to show in-phase synchronization of two neurons as they interact through mutually excitatory synapses. Typically Vmax=1-2V for both synapses. If Vmax<0.8V the neurons are decoupled and oscillate at their own natural frequency. Synchronization by excitatory synapses has the effect of forcing neurons 1 and 2 to oscillate at the same frequency and in-phase.

Figure 20:
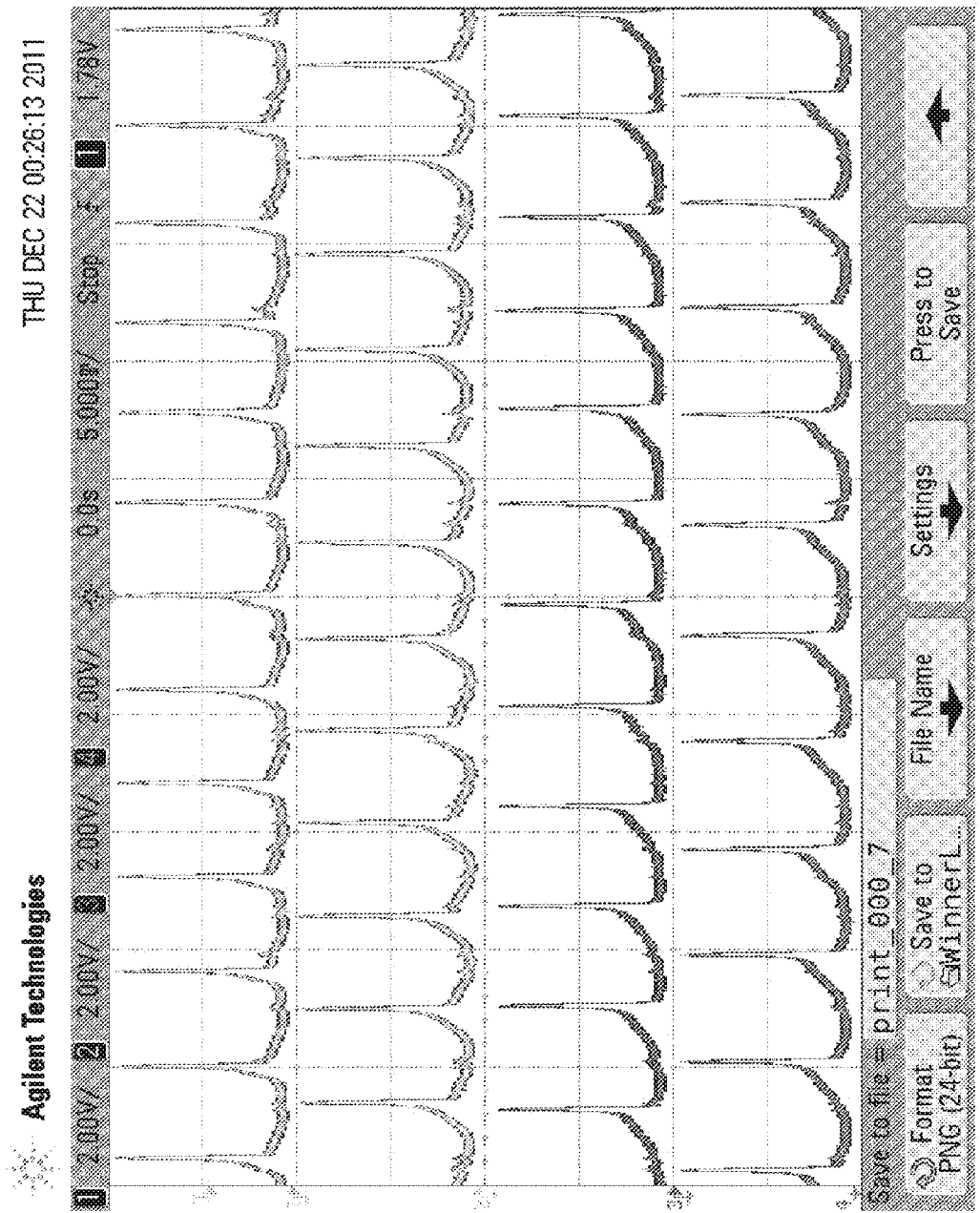
FIG. 20 is a set of plots to show anti-phase synchronization of two neurons coupled via mutually inhibitory synapses according to an example.

FIG. 20 is a set of plots to show anti-phase synchronization of two neurons coupled via mutually inhibitory synapses according to an example. Typically Vmax=1-2V for both synapses. Synchronization by mutually inhibitory synapses has the effect of forcing neurons 1 and 2 to oscillate at the same frequency but out-of-phase with each other.

Figure 21:
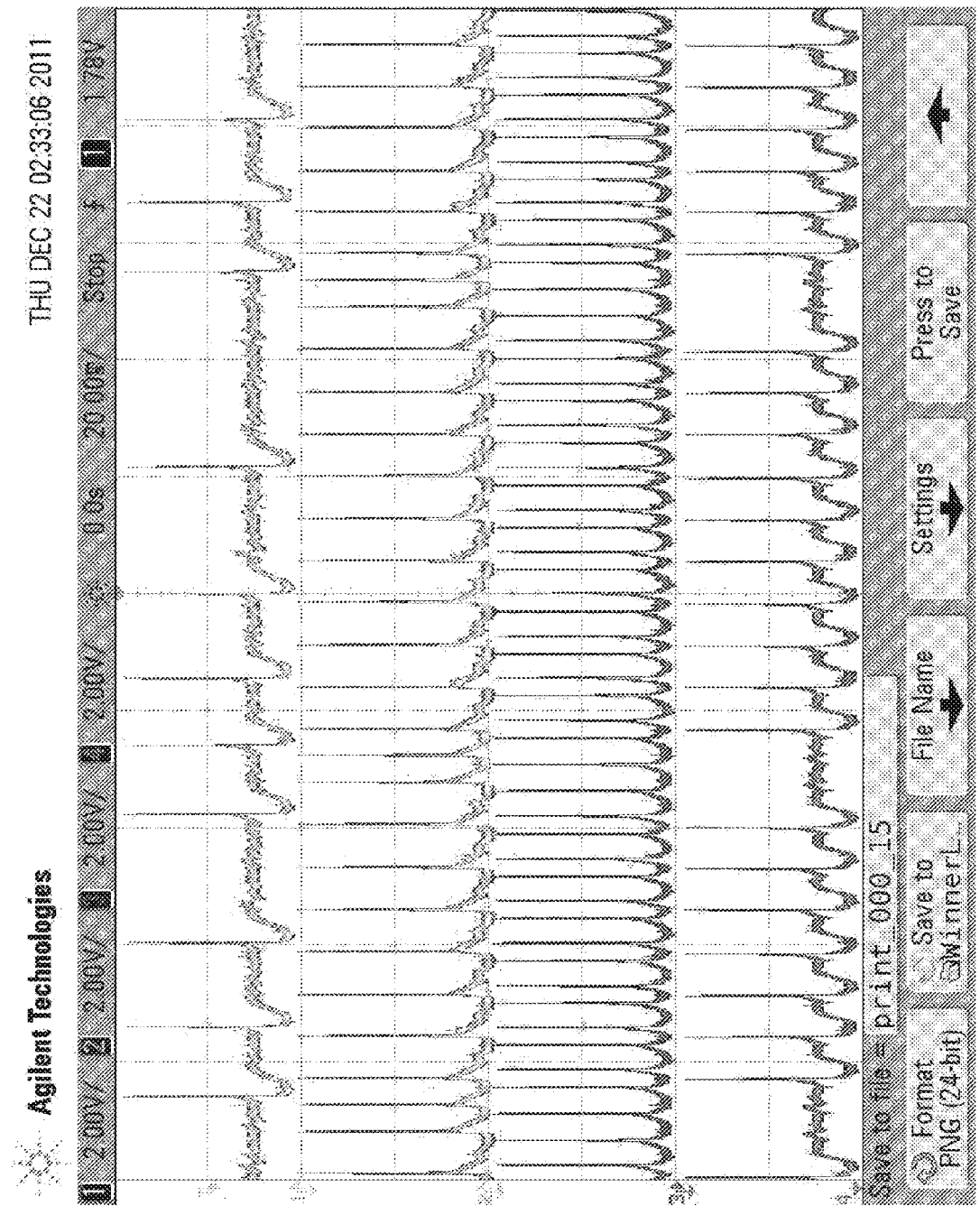
FIG. 21 is a set of plots to show the oscillations of 4 neurons that compete through mutually inhibitory synapses giving complex coordination patterns according to an example.

FIG. 21 shows a typical spatio-temporal pattern output by 4 neurons that compete with each other through mutually inhibitory synapses. The 12 synapses were set at random values in the range Vmax=1-2V. Desired coordination patterns may be obtained by programming the synapses using data assimilation techniques for example.

Figure 22:
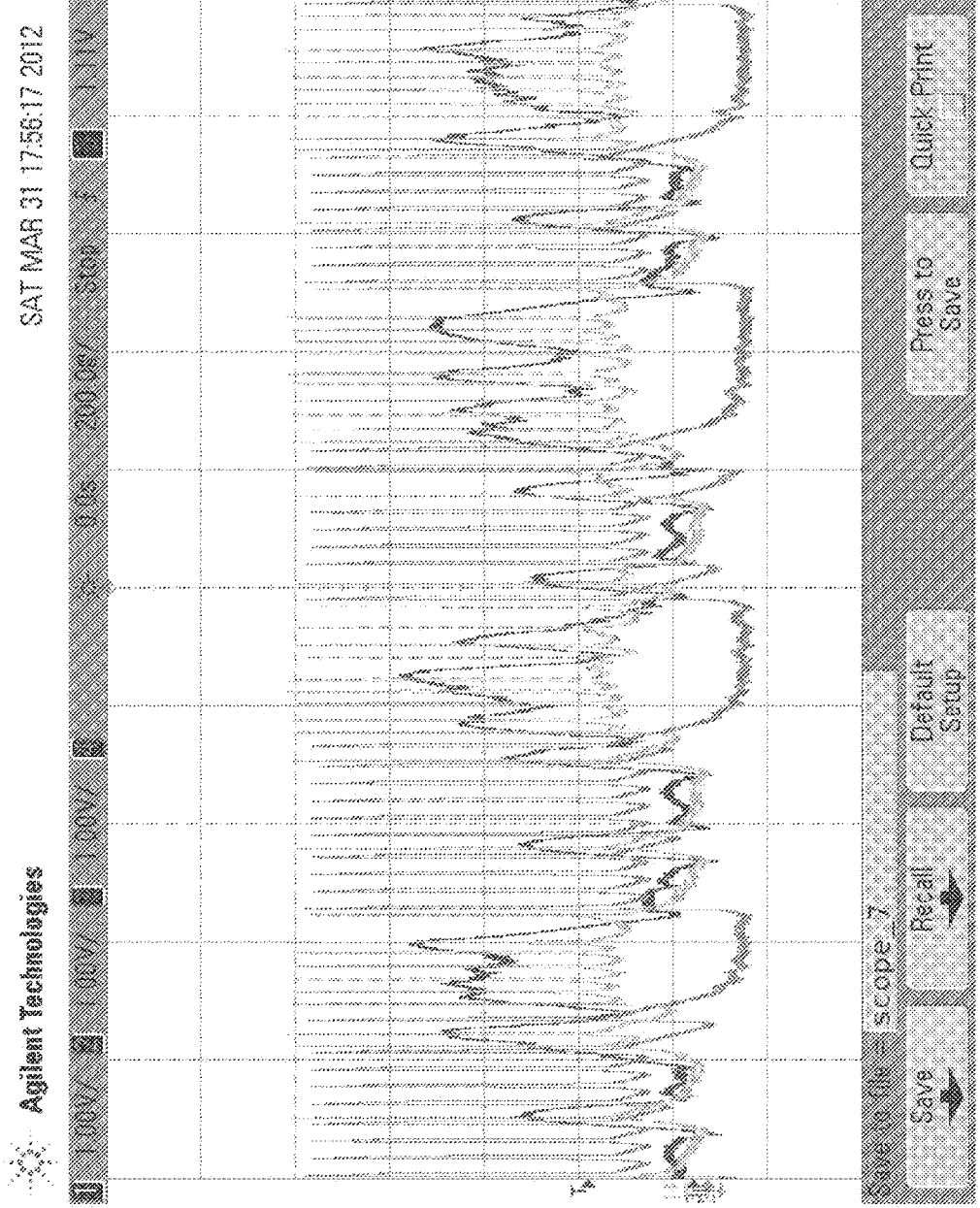
FIG. 22 shows the synchronization of a mutually inhibitory pair of according to an example.

FIG. 22 shows an example of synchronization of a CPG according to an example to a complex rhythm, which can be the respiration ENG of live rats for example (trace 3). The aim was to generate firing patterns in phase and out-of-phase to modulate the heart beat via electrodes stimulating the vagus nerve. Of particular interest are the out-of-phase neuron bursts—trace 2—which have the heart pump faster during expiration. The CPG therefore naturally provides, in phase, anti-phase synchronization to very complex biological rhythms, a feat which is out of the reach of the most sophisticated pacemakers (biventricular pacemakers).

What is claimed is:

1. An artificial asynchronous neural network system comprising a plurality of neurons each of which is operable to receive a respective input signal representing an input stimulus for the network, and to generate an output signal in response to receipt of such an input stimulus, the network system having a fixed predetermined physical configuration and being operable to supply output signals representing respective spatio-temporal sequences of rhythmic electric pulses to an external system in response to receipt of such input stimuli, each combination of such input stimuli generating a respective output signal, wherein said neurons are composed of respective pairs of differential CMOS transistors, wherein respective pairs of the multiple neurons are interconnected using mutually inhibitory links with asymmetric conductances, each link providing a synapse and formed using a differential current amplifier, the neurons and mutually inhibitory links forming the fixed predetermined physical configuration of the network system, which configuration is independent of received input signals.

2. An artificial asynchronous neural network system as claimed in claim 1, wherein a proportion of the neurons are interconnected using mutually excitatory links such that the network provides predetermined functions of a central pattern generator.

3. An artificial asynchronous neural network system as claimed in claim 1, wherein a neuron membrane includes multiple conductance components operable to mimic a response of biological neurons.

4. An artificial asynchronous neural network system as claimed in claim 1, wherein a neuron membrane has a membrane voltage and includes multiple conductance components defining neuron membrane ionic channels operable to mimic a response of biological neurons, in which the conductance of the neuron membrane ionic channels serves to control the membrane voltage of a neuron.

5. An artificial asynchronous neural network system as claimed in claim 1, wherein a neuron membrane has a membrane voltage and includes multiple conductance components defining neuron membrane ionic channels operable to mimic a response of biological neurons, in which the conductance of the neuron membrane ionic channels serves to control the membrane voltage of a neuron, and wherein such a differential current amplifier is adapted to receive as inputs respective output membrane voltage measures from a pair of neurons.

6. An artificial asynchronous neural network system as claimed in claim 1, wherein the differential current amplifier is adapted to receive a control signal as an input to control conductance of the synapse.

7. An artificial asynchronous neural network system as claimed in claim 1, wherein selected input signals generate specific limit cycles for the network system in response to the timing of current stimuli applied to individual neurons of the network system.

8. A central pattern generator comprising an artificial asynchronous neural network system comprising a plurality of neurons each of which is operable to receive a respective input signal representing an input stimulus for the network, and to generate an output signal in response to receipt of such an input stimulus, the network system having a fixed predetermined physical configuration and being operable to supply respective output signals representing spatio-temporal sequences of rhythmic electric pulses to an external system in response to receipt of such input stimuli, each combination of such input stimuli generating a respective output signal, wherein said neurons are composed of respective pairs of differential CMOS transistors, wherein respective pairs of the multiple neurons are interconnected using mutually inhibitory links with asymmetric conductances, each link providing a synapse and being formed using a differential current amplifier, wherein the multiple neurons are connected together in the fixed predetermined configuration using such mutually inhibitory links, such that the neurons are operable to receive input signals representing an input stimulus for the generator and to supply such an output signal representing a sequence of periodic electric pulses for use in an external system.

9. A central pattern generator as claimed in claim 8, wherein the CMOS transistors representing channel conductance components for the neurons, and wherein the channel conductance components are operable to use the input signals to provide a membrane voltage value for a neuron.

10. A central pattern generator as claimed in claim 8, wherein CMOS transistors representing channel conductance components for the neurons, and wherein the channel conductance components are operable to use the input signals to provide a membrane voltage value for a neuron, wherein the differential current amplifier is a CMOS-based differential current amplifier including a control transistor operable to control a conductance value of the synaptic link.

11. A central pattern generator as claimed in claim 8, wherein CMOS transistors representing channel conductance components for the neurons, and wherein the channel conductance components are operable to use the input signals to provide a membrane voltage value for a neuron, and wherein the differential current amplifier is a CMOS-based differential current amplifier including a control transistor operable to control a conductance value of the synaptic link, and wherein the control transistor is operable to provide a conductance value representing a degree of coupling between neurons whose membrane voltages are input to the differential current amplifier.

12. A central pattern generator as claimed in claim 8, wherein the CMOS transistors representing channel conductance components for the neurons, and wherein the channel conductance components are operable to use the input signals to provide a membrane voltage value for a neuron, and wherein the differential current amplifier is a CMOS-based differential current amplifier including a control transistor operable to control a conductance value of the synaptic link, the generator being operable to provide an excitatory or inhibitory action by redirecting an output current towards the pre- or the post-synaptic neuron.

13. An integrated circuit comprising multiple differential pairs of CMOS transistors arranged to form an artificial neural network system as claimed in claim 1.

14. An integrated circuit comprising multiple differential pairs of CMOS transistors arranged to form a central pattern generator as claimed in claim 8.

15. A method of generating a coordinated spatio-temporal sequence of electrical pulses using an artificial neural network system comprising a plurality of neurons each of which is operable to receive a respective input signal representing an input stimulus for the network, and to generate an output signal in response to receipt of such an input stimulus, the network system having a fixed predetermined physical configuration and being operable to supply output signals representing respective spatio-temporal sequences of rhythmic electric pulses to an external system in response to receipt of such input stimuli, each combination of such input stimuli generating a respective output signal, wherein said neurons are composed of respective pairs of differential CMOS transistors, wherein respective pairs of the multiple neurons are interconnected using mutually inhibitory links with asymmetric conductances, each link providing a synapse and formed using a differential current amplifier, the neurons and mutually inhibitory links forming the fixed predetermined physical configuration of the network system, which configuration is independent of received input signals, the method comprising:
- interconnecting multiple CMOS-based neuron components composed of respective pairs of differential CMOS transistors using mutually inhibitory synaptic links having asymmetric conductances, each link being formed using a differential current amplifier, by selecting a conductance value for artificial synaptic links which corresponds to an inhibitory synapse, the multiple CMOS-based neuron components forming a fixed predetermined physical configuration of the network system, which configuration is independent of received input signals;
- providing input stimuli for the network system to cause multiple ones of the neurons to fire along a stable path in the network system; and
- generating respective output sequences of spatio-temporal sequences of rhythmic electrical pulses in response to receipt of such input stimuli each combination of such input stimuli generating a respective output signal.

16. A method as claimed in claim 15, wherein, for a pair of neurons in the network, the conductance value is selected such that a current injected into the post-synaptic neuron is proportional to the voltage difference between the membrane voltage of the pre-synaptic neuron and the membrane voltage of the post-synaptic neuron.

17. A method as claimed in claim 15, wherein an inhibitory synapse includes a differential current amplifier, the conductance value controlled using the gate voltage of a current source for the amplifier.

18. A method as claimed in claim 15, wherein the neural network is asynchronous.

19. A pacemaker for use with a heart for coordinating contraction of the heart chambers by stimulating them with a coordinated sequence of electrical pulses, the pacemaker comprising:
- a central pattern generator including an artificial asynchronous neural network system comprising a plurality of neurons each of which is composed of a pair of differential CMOS transistors, and is operable to receive a respective input signal representing an input stimulus for the network, and to generate an output signal in response to receipt of such an input stimulus, the network system having a fixed predetermined physical configuration and being operable to supply respective output signal representing spatio-temporal sequences of rhythmic electric pulses to an external system in response to receipt of such input stimuli, wherein respective pairs of the multiple neurons are interconnected using mutually inhibitory links with asymmetric conductances, each link providing a synapse and formed using a differential current amplifier, wherein the multiple neurons are connected together in the fixed predetermined configuration using such mutually inhibitory links, such that the neurons are operable to receive input signals representing an input stimulus for the generator and to supply such an output signal representing a sequence of periodic electric pulses for use in an external system, the pacemaker being operable to provide such a coordinated sequence of pulses responsive to an input stimulus.

20. A pacemaker as claimed in claim 19, operable to coordinate strokes of the heart chambers using the sequence of pulses.

21. A pacemaker as claimed in claim 19, wherein the central pattern generator is operable to synchronise the coordinated sequence of pulses in response to changes in the input stimulus in order to modulate the strokes of the chambers.

22. A pacemaker as claimed in claim 19, wherein the central pattern generator is operable to synchronise the coordinated sequence of pulses in response to changes in the input stimulus in order to modulate the strokes of the chambers, and wherein the central pattern generator is operable to modulate the strokes of the chambers to synchronise with other body rhythms.

23. A pacemaker as claimed in claim 19, wherein the central pattern generator is operable to synchronise the coordinated sequence of pulses in response to changes in the input stimulus in order to modulate the strokes of the chambers, and wherein the central pattern generator is operable to adjust the input stimulus in response to changes in an external condition.

* * * * *